(12) United States Patent  (10) Patent No.: US 7,920,327 B2
Ohata et al.  (45) Date of Patent: Apr. 5, 2011

(54) IMAGE CAPTURING APPARATUS AND OPTICAL ADJUSTMENT METHOD

(75) Inventors: Atsushi Ohata, Tokyo (JP); Daisuke Kuroda, Kanagawa (JP); Masayuki Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/656,426

(22) Filed: Jan. 29, 2010

(65) Prior Publication Data

US 2010/0246027 A1    Sep. 30, 2010

(30) Foreign Application Priority Data

Mar. 31, 2009   (JP) ................................ 2009-086541

(51) Int. Cl.
 *G02B 15/14*   (2006.01)
(52) U.S. Cl. ........ 359/557; 359/689; 359/713; 359/714; 359/715
(58) Field of Classification Search ................ 359/557, 359/676, 680–692, 713–716, 708
See application file for complete search history.

(56) References Cited

U.S. PATENT DOCUMENTS

| 6,771,430 B2 * | 8/2004 | Obama | ................... 359/682 |
| 6,870,688 B2 * | 3/2005 | Obama | ................... 359/680 |
| 6,925,253 B2 * | 8/2005 | Miyatake | ............... 359/689 |

FOREIGN PATENT DOCUMENTS

| JP | 2005-049598 A | 2/2005 |
| JP | 2006-064986 A | 3/2006 |

* cited by examiner

*Primary Examiner* — Evelyn A. Lester
(74) *Attorney, Agent, or Firm* — Rader, Fishman & Grauer PLLC

(57) ABSTRACT

An image capturing apparatus includes: at least one or more vertically movable lens groups among at least three or more lens groups, which constitute a zoom lens, movable in an optical axis direction, the vertically movable lens group being movable in a direction substantially perpendicular to the optical axis; a zoom lens group among the three or more lens groups, the zoom lens group being movable in the optical axis direction; and a correction mechanism that corrects a position of the optical axis based on the three or more lens groups by moving the vertically movable lens group in a wide-angle end state to a predetermined position in the substantially perpendicular direction. When the vertically movable lens group is moved for the purpose of anti-vibration at each zoom position in the substantially perpendicular direction, the apparatus is configured to satisfy the following Conditional Expression (1).

$$0.7 < (Lw+Bw)/Bt < 1.3 \qquad (1)$$

8 Claims, 17 Drawing Sheets

FIG. 1A
BEFORE ADJUSTMENT OF LIGHT AMOUNT BALANCE
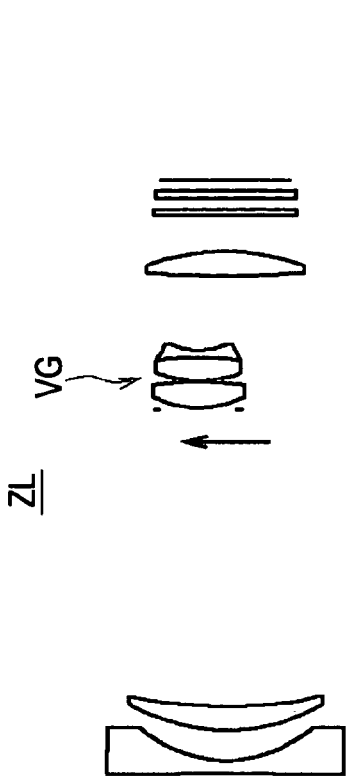
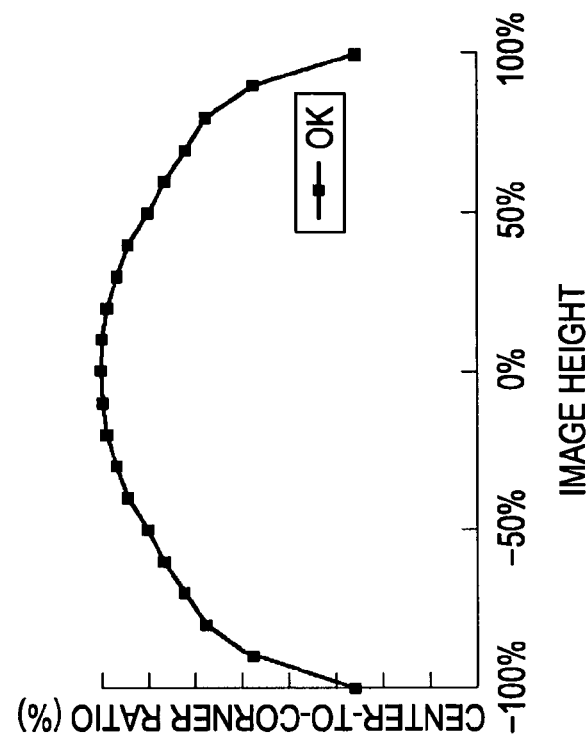
FIG. 1B
AFTER ADJUSTMENT OF LIGHT AMOUNT BALANCE
CONCEPT OF ADJUSTMENT OF LIGHT AMOUNT BALANCE
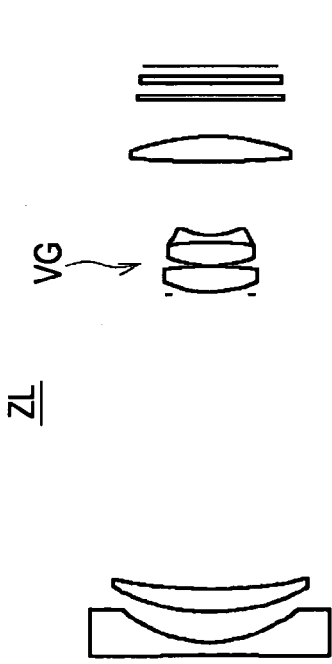
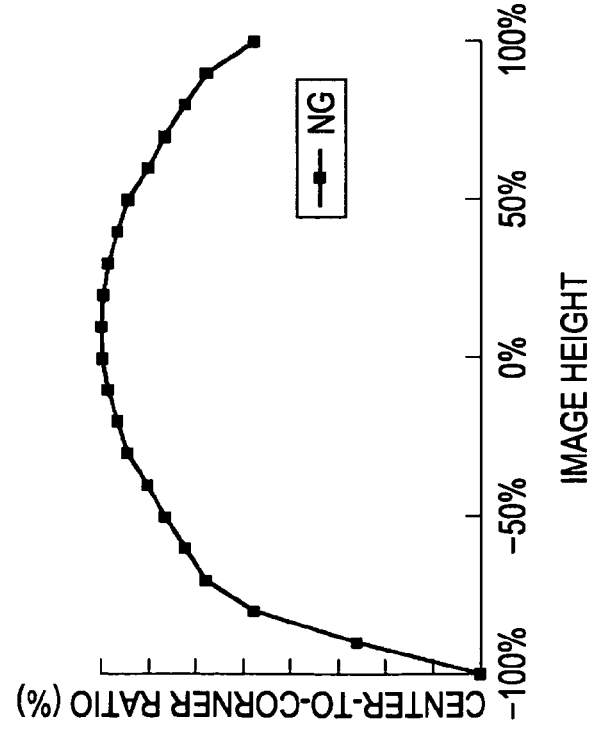

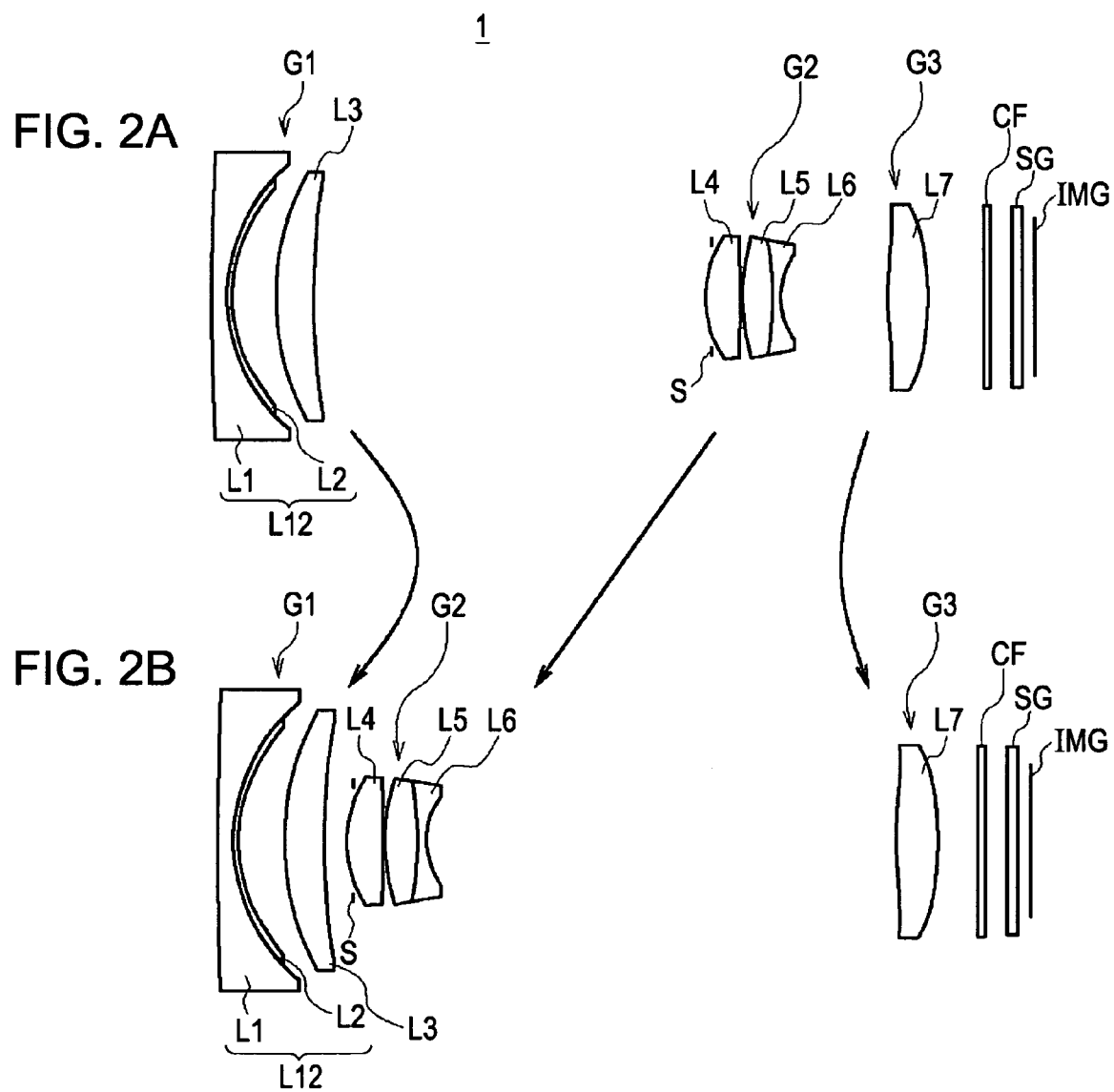

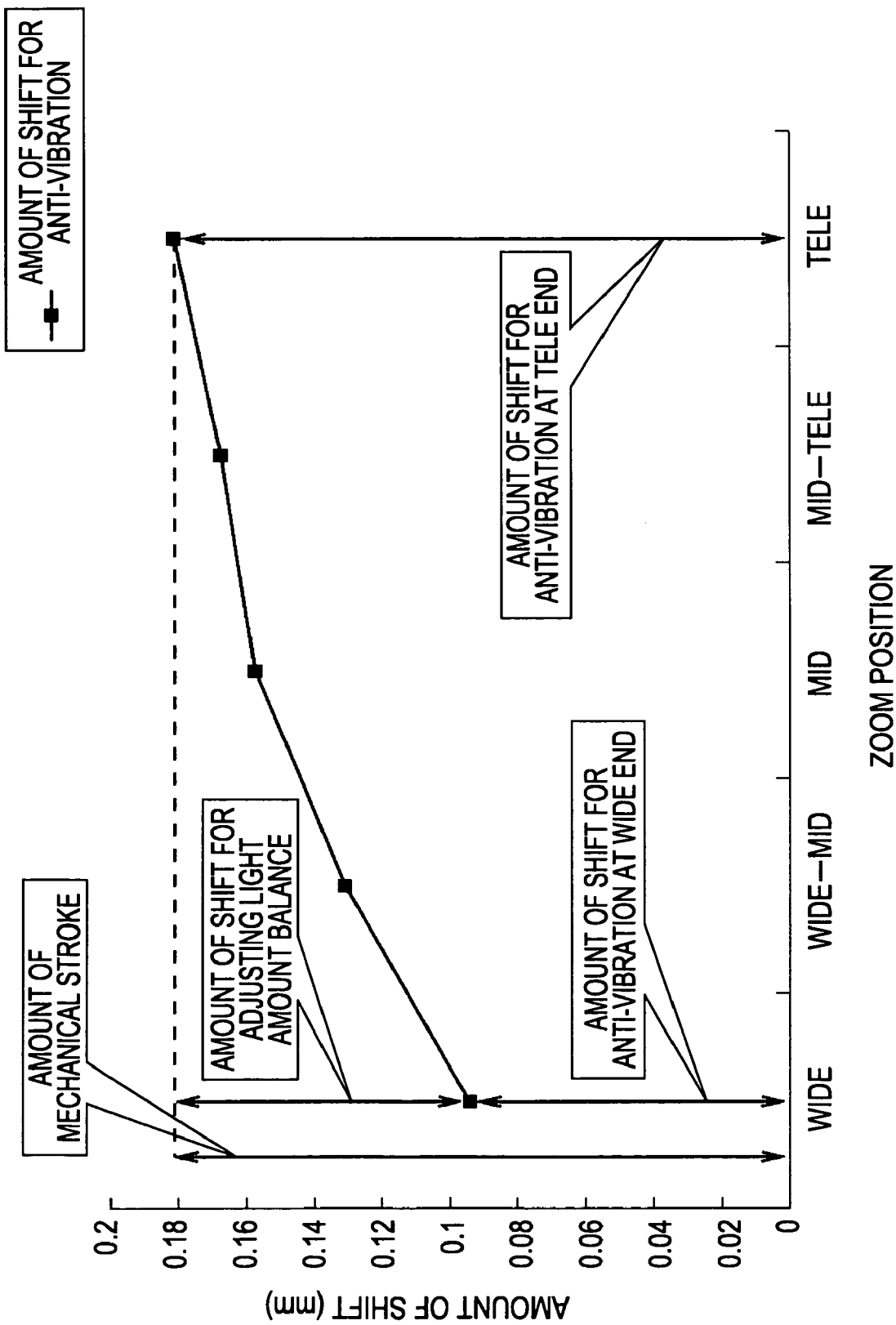

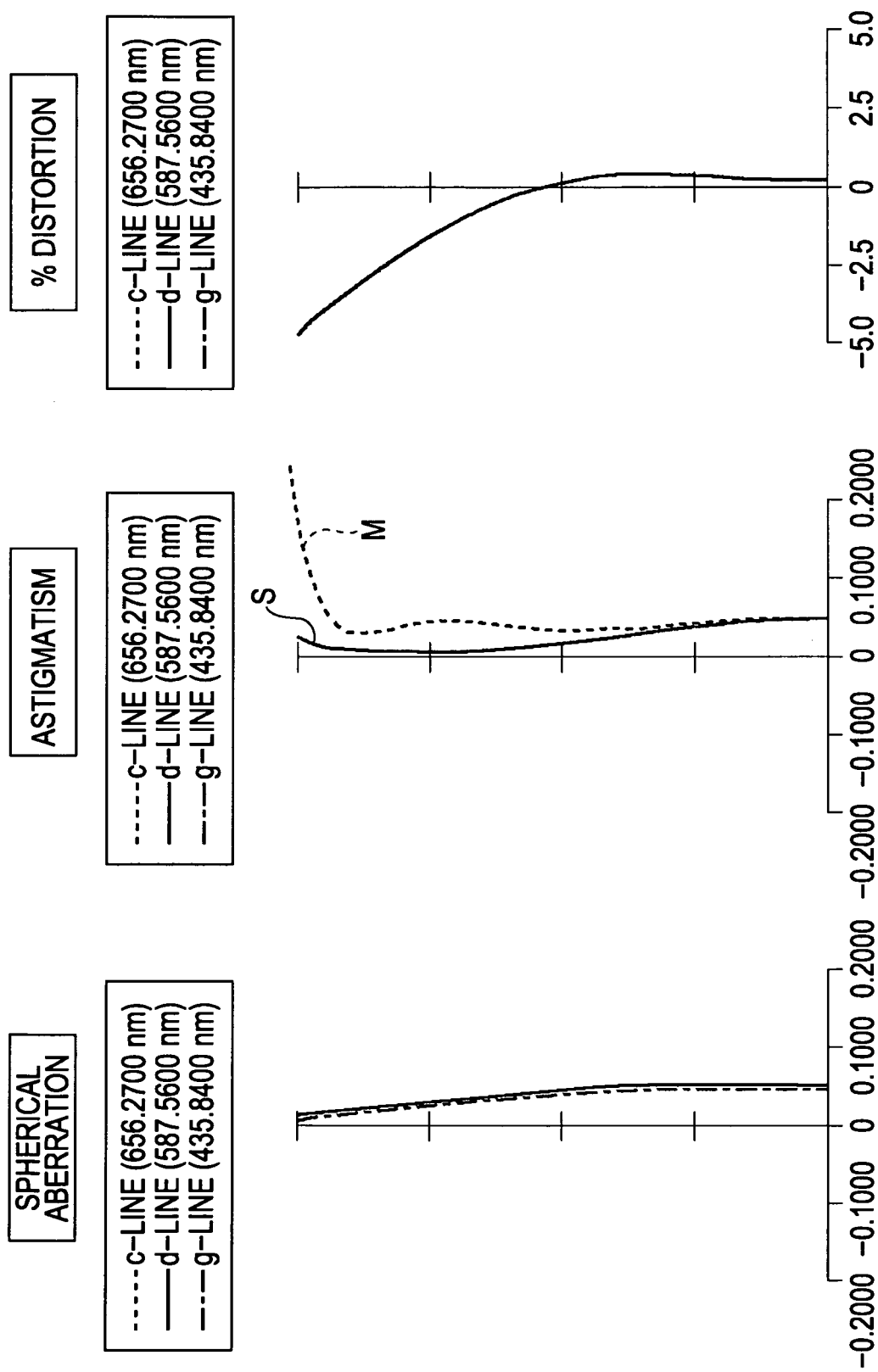

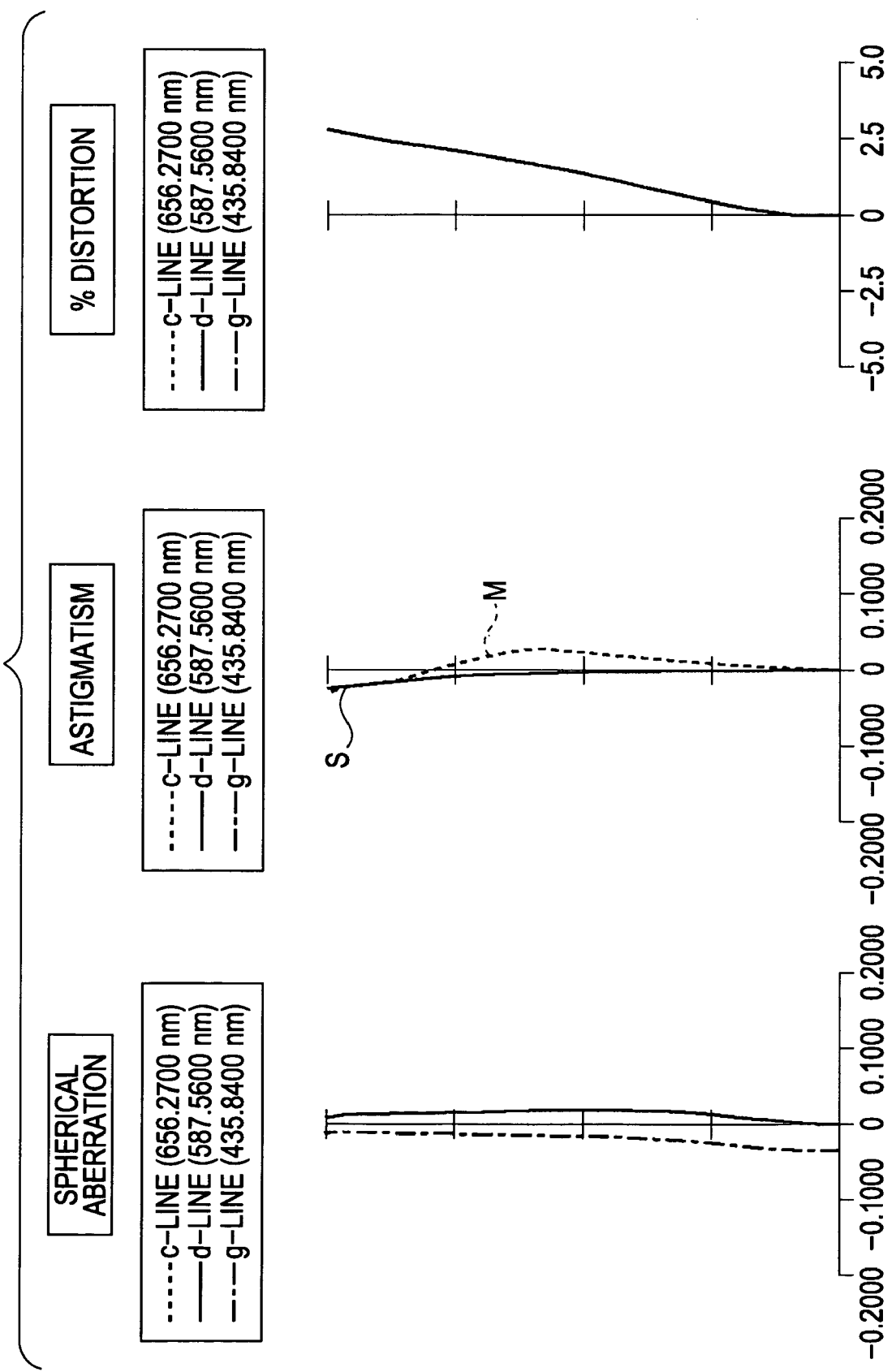

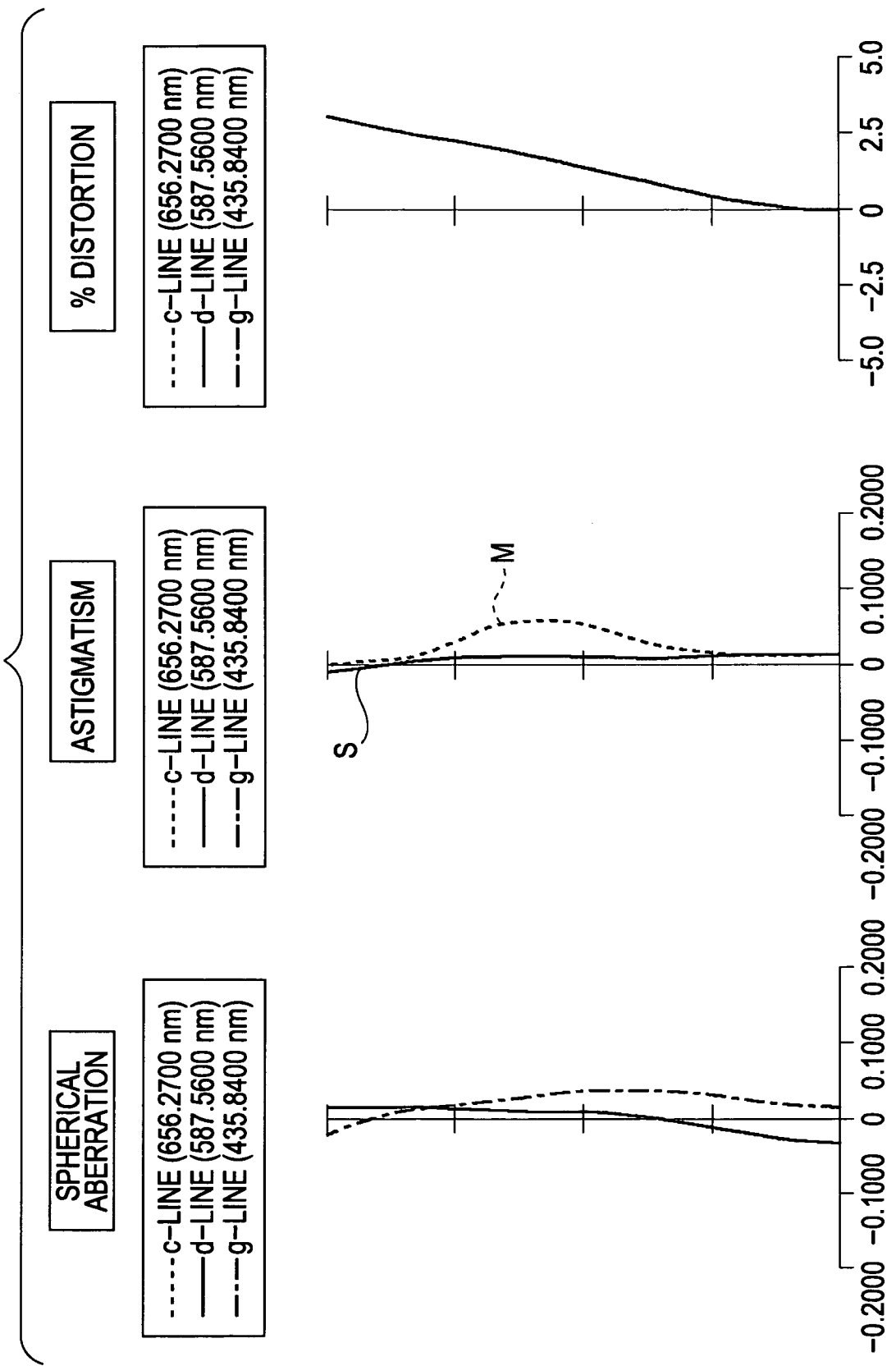

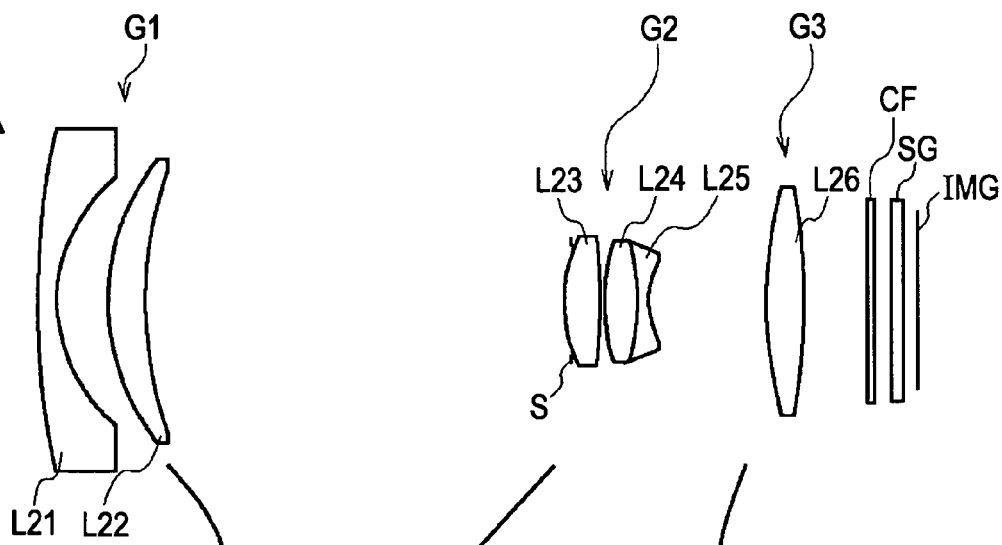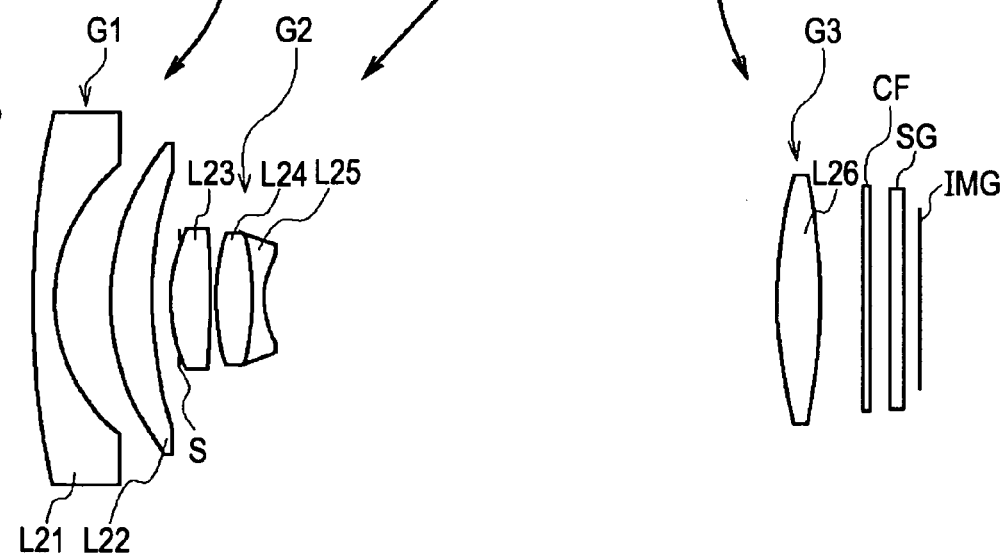

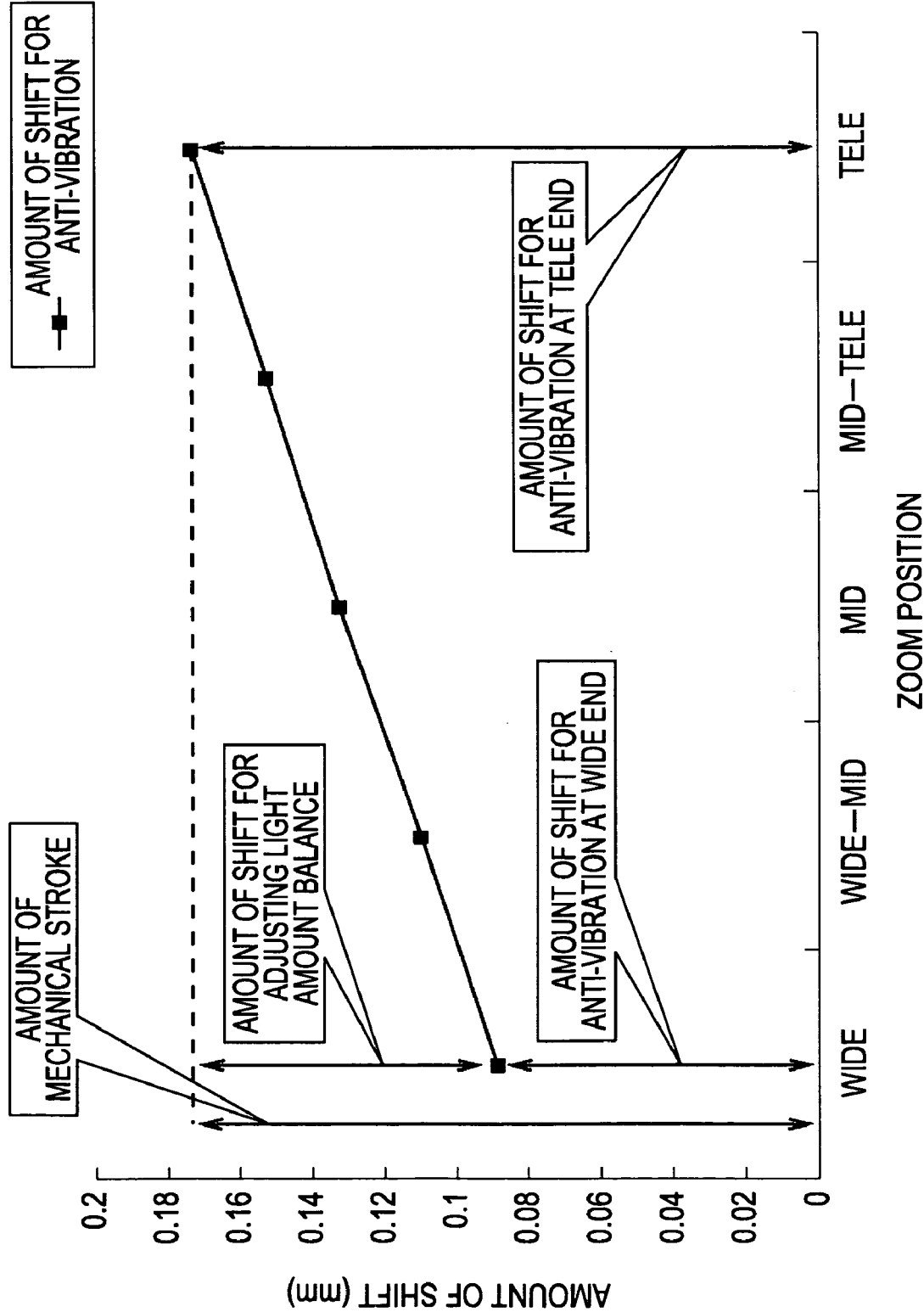

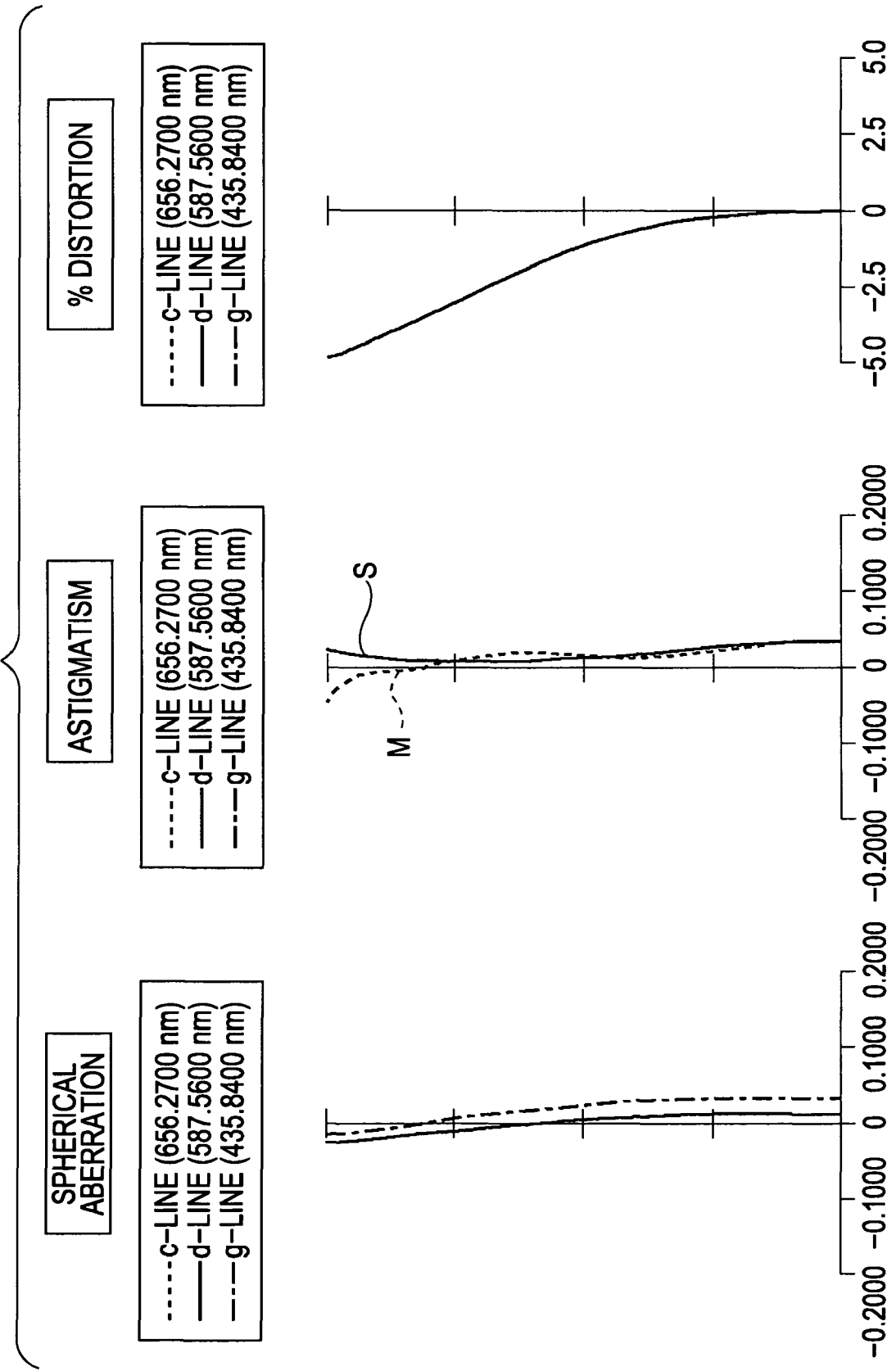

FIG. 10
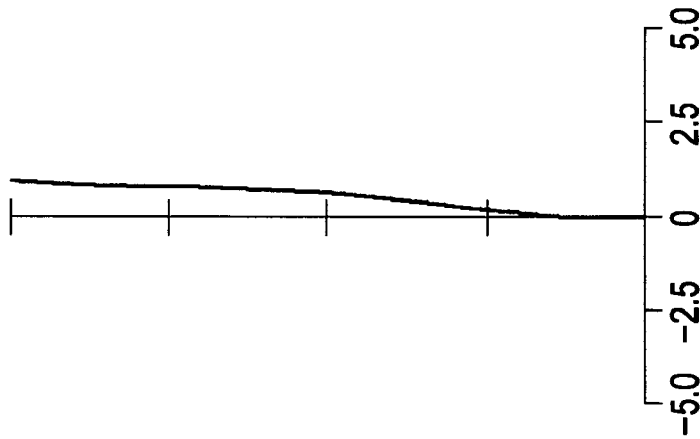
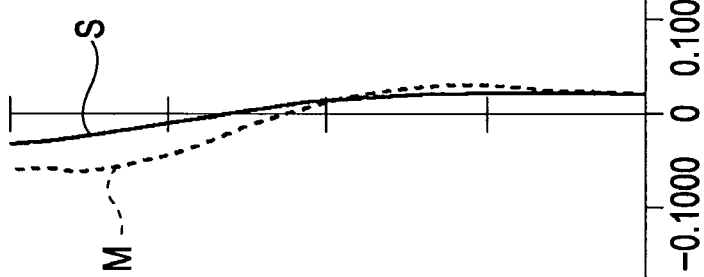
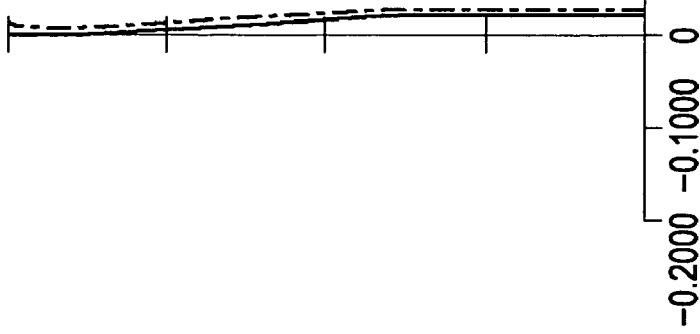

IMAGE CAPTURING APPARATUS AND OPTICAL ADJUSTMENT METHOD

BACKGROUND OF THE INVENTION

1. Field of the Invention

The present invention relates to an image capturing apparatus and an optical adjustment method, and is particularly appropriate to be applicable to an image capturing apparatus such as a digital video camera or a digital camera having a zoom mechanism.

2. Description of the Related Art

In the past, digital cameras using image pickup devices such as CCD (Charge Coupled Device) and CMOS (Complementary Metal Oxide Semiconductor) have spread rapidly, and have become general.

As described above, as the digital cameras have becomes general, user demand for a decrease in size, an increase in angle of view, and an increase in magnification particularly of the digital cameras integrally formed with a lens has become strong. Furthermore, recently, there is a tendency to increase the number of pixels of the image pickup device every year, and thus the demand for an increase in image quality has also become strong.

However, there is a problem in that the peripheral light amounts at the four corners of the image pickup surface of the image pickup device in the wide-angle end state in a lens design are lowered by the influence of the decrease in size and the increase in angle of view. In addition, there is also a problem in lowering in amount of the peripheral light caused by asymmetry (unbalance) of amounts of peripheral light due to manufacturing variation.

On the other hand, due to the demand for an increase in image quality, the anti-vibration mechanism has come into widespread use. However, there have been proposed control methods for correcting the deviation, which occurs between the center position of the image pickup device and the optical axis of the lens groups for each zoom position, by using an anti-vibration lens group (for example, Japanese Unexamined Patent Application Publication No. 2005-49598, and Japanese Unexamined Patent Application Publication No. 2006-64986).

SUMMARY OF THE INVENTION

However, in the above-mentioned image capturing apparatuses of the related art disclosed in Japanese Unexamined Patent Application Publication No. 2005-49598 and Japanese Unexamined Patent Application Publication No. 2006-64986, the deviation, which occurs between the center position of the image pickup device and the optical axis of the lens groups for each zoom position, is corrected by using the anti-vibration lens group. For this reason, there is a problem in that the circumferences of the anti-vibration lens group increase, that is, the size of the lens increases.

Furthermore, in the above-mentioned image capturing apparatuses of the related art disclosed in Japanese Unexamined Patent Application Publication No. 2005-49598 and Japanese Unexamined Patent Application Publication No. 2006-64986, when the deviation, which occurs between the center position of the image pickup device and the optical axis of the lens groups, is corrected by the anti-vibration lens group, an amount of the correction should be calculated for each zoom position. Accordingly, there is also a problem in that manufacturing process time increases.

The following embodiments of the invention have been made in view of the above problems. In particular, it is desirable to provide an optical adjustment method and an image capturing apparatus with a simple configuration capable of achieving high image quality in a way that prevents the light amount from being lowered by improving the light amount balance of the peripheral light amounts at the four corners of the image pickup surface of the image pickup device in the wide-angle end state.

According to an embodiment of the invention, an image capturing apparatus includes: at least one or more vertically movable lens groups among at least three or more lens groups, which constitute a zoom lens, movable in an optical axis direction, the vertically movable lens group being movable in a direction substantially perpendicular to the optical axis; a zoom lens group among the three or more lens groups, the zoom lens group being movable in the optical axis direction; and a correction mechanism that corrects a position of the optical axis based on the three or more lens groups by moving the vertically movable lens group in a wide-angle end state to a predetermined position in the substantially perpendicular direction. When the vertically movable lens group is moved for the purpose of anti-vibration at each zoom position in the substantially perpendicular direction, the apparatus is configured to satisfy the following Conditional Expression (1).

$$0.7 < (Lw+Bw)/Bt < 1.3, \quad (1)$$

where $Lw$ is an amount of shift for correcting the position of the optical axis, $Bw$ is an amount of shift for anti-vibration in the wide-angle end state, and $Bt$ is an amount of shift for anti-vibration in a telephoto end state.

Conditional Expression (1) is for achieving a decrease in size and an increase in performance by adjusting the light amount balance of the peripheral light amounts at the four corners of the image pickup surface of the image pickup device using the vertically movable lens group in the wide-angle end state and by appropriately setting the amounts of shift for anti-vibration using the vertically movable lens group in the wide-angle end state and the telephoto end state.

If the result value of Conditional Expression (1) is less than the lower limit thereof, in the image capturing apparatus according to the embodiment of the invention, it is difficult to secure sufficiently the amount of anti-vibration and the amount of shift for adjusting light amount balance in the wide-angle end state, thereby lowering the image quality.

Further, if the result value of Conditional Expression (1) is more than the upper limit thereof, the amount of shift for adjusting light amount balance of the vertically movable lens group increases excessively. Hence, the light amount balance is improved, but this causes an increase in size of the lens (an increase in the external diameter of the first lens group and the peripheral portion of the vertically movable lens group).

That is, in the image capturing apparatus, the amounts of shift for anti-vibration using the vertically movable lens group in the wide-angle end state and the telephoto end state are appropriately set, thereby providing a difference (the amount of shift for anti-vibration in the wide-angle end state is smaller than the amount of shift for anti-vibration in the telephoto end state) to the amounts of shift for anti-vibration of the vertically movable lens group in the wide-angle end state and the telephoto end state.

With such a configuration, in the image capturing apparatus, the difference of the amounts of shift for anti-vibration of the vertically movable lens group in the wide-angle end state and the telephoto end state can be used to adjust the light amount balance of the peripheral light amounts at the four corners of the image pickup surface of the image pickup device in the wide-angle end state. Therefore, it is possible to secure sufficient anti-vibration performance and improve the light amount balance while maintaining a small size.

Further, the image capturing apparatus according to the embodiment includes: at least one or more vertically movable lens groups among at least three or more lens groups that are movable in an optical axis direction, the vertically movable lens group being movable in a direction substantially perpendicular to the optical axis; a zoom lens group among the lens groups, the zoom lens group being movable in the optical axis direction; and a correction mechanism that corrects a position of the optical axis based on the three or more lens groups by moving the vertically movable lens group in a wide-angle end state to a predetermined position in the substantially perpendicular direction. With such a configuration, it is preferable that the apparatus satisfy the following Conditional Expressions (2) and (3).

$$0.2 < ((1-\beta iw) \times \beta rw)/((1-\beta it) \times \beta rt) < 0.7, \text{ and} \quad (2)$$

$$((1-\beta iw) \times \beta rw) > fw \times \tan 0.5, \quad (3)$$

where $\beta iw$ is a paraxial lateral magnification of the vertically movable lens group at the wide-angle end state, $\beta rw$ is a paraxial lateral magnification of a lens group disposed closer to the image pickup surface side than the vertically movable lens group in the wide-angle end state, $\beta it$ is a paraxial lateral magnification of the vertically movable lens group in the telephoto end state, $\beta rt$ is a paraxial lateral magnification of a lens group disposed closer to the image pickup surface side than the vertically movable lens group in the telephoto end state, and $fw$ is a focal length in the wide-angle end state.

Conditional Expressions (2) and (3) are for embodying the image capturing apparatus in which the peripheral light amounts at the four corners of the image pickup surface of the image pickup device are balanced.

If the result value of Conditional Expression (2) is less than the lower limit thereof, the sensitivity of anti-vibration in the wide-angle end state is low relative to the telephoto end state (the amount of shift of the image pickup surface is small when the vertically movable lens group is moved by a unit length in the direction substantially perpendicular to the optical axis), and in order to obtain a certain effect of correction for anti-vibration, it is necessary to increase the amount of shift for anti-vibration of the vertically movable lens group. Thus, when the amount of shift for adjusting light amount balance is secured, the size of the apparatus increases.

Furthermore, if the result value of Conditional Expression (2) is more than the upper limit thereof, it is necessary to keep the amount of mechanical stroke large with a view to securing a high zoom ratio and anti-vibration performance in the telephoto end state. Therefore, the size of the entire image capturing apparatus increases.

That is, when the image capturing apparatus satisfies Conditional Expression (2), a ratio of the sensitivities of anti-vibration in the wide-angle end state and the telephoto end state can be appropriately set. Hence, the sum of the amount of shift for anti-vibration and the amount of shift for adjusting light amount balance in the wide-angle end state does not excessively become larger or smaller than the amount of shift for anti-vibration in the telephoto end state. As a result, it is possible to embody a high-performance and small-sized image capturing apparatus.

Specifically, when the image capturing apparatus satisfies Conditional Expressions (2) and (3), it is possible to reduce the amount of shift for anti-vibration of the vertically movable lens group in the wide-angle end state rather than the amount of shift for anti-vibration of the vertically movable lens group in the telephoto end state. Therefore, it is possible to use effectively the extra amount of mechanical stroke in the wide-angle end state as the amount of shift for adjusting light amount balance at the time of adjusting the light amount balance.

Furthermore, it is preferable that the image capturing apparatus satisfy the following Conditional Expression (4).

$$((1-\beta it) \times \beta rt)/((1-\beta iw) \times \beta rw) < 1.1 \times (Bt/Bw) \quad (4)$$

In the image capturing apparatus, by satisfying Conditional Expression (4) and appropriately setting the ratio of the amounts of shift for anti-vibration in the telephoto end state and the wide-angle end state, it is possible to improve effectively the light amount balance of peripheral light amounts at the four corners of the image pickup surface of the image pickup device while achieving effective anti-vibration correction.

If the result value of Conditional Expression (4) is more than the upper limit, in the image capturing apparatus, an anti-vibration correction angle in the wide-angle end state becomes larger than the anti-vibration correction angle in the telephoto end state. However, usually brightness in the wide-angle end state becomes higher than that in the telephoto end state, and thus a shutter speed thereof is high, and the focal length thereof is short. As a result, hand shake has almost no influence thereon.

That is, considering a general photographing scene, in order to obtain a large correction angle set for anti-vibration and sufficient light amount balance in the wide-angle end state, it is difficult to avoid an increase in size of the lens.

Further, it is preferable that the image capturing apparatus satisfy the following Conditional Expression (5).

$$\alpha \times ((1-\beta iw) \times \beta rw)/((1-\beta it) \times \beta rt) > 1.33 \quad (5)$$

where $\alpha$ is a zoom ratio of the zoom lens group.

In the image capturing apparatus, by satisfying Conditional Expression (5), it is possible to prevent the peripheral light amounts at the four corners of the image pickup surface of the image pickup device in the wide-angle end state from being lowered while maintaining sufficient anti-vibration performance in both of the telephoto end state and the wide-angle end state.

If the result value of Conditional Expression (5) is less than the lower limit thereof, in a case where the anti-vibration correction angles in the wide-angle end state and the telephoto end state are set to be approximately equal to each other, a ratio of anti-vibration position sensitivities in the wide-angle end state and the telephoto end state is small. Hence, when sufficient anti-vibration performance is secured in the wide-angle end state and sufficient amount of shift for adjusting light amount balance is secured, the amount of shift becomes larger than the amount of shift for anti-vibration in the telephoto end state. As a result, the size of the apparatus increases.

According to another embodiment of the invention, an optical adjustment method is provided for an image capturing apparatus including at least one or more vertically movable lens groups among at least three or more lens groups, which constitute a zoom lens, movable in an optical axis direction, the vertically movable lens group being movable in a direction substantially perpendicular to the optical axis, a zoom lens group among the three or more lens groups, the zoom lens group being movable in the optical axis direction, and a correction mechanism that corrects a position of the optical axis based on the three or more lens groups by moving the vertically movable lens group in a wide-angle end state to a predetermined position in the substantially perpendicular direction. The optical adjustment method includes the step of moving the vertically movable lens group for the purpose of anti-vibration at each zoom position in the substantially perpendicular direction. In addition, the method is configured to satisfy the following Conditional Expression (1).

$$0.7<(Lw+Bw)/Bt<1.3, \qquad (1)$$

where

Lw is an amount of shift for correcting the position of the optical axis,

Bw is an amount of shift for anti-vibration in the wide-angle end state, and

Bt is an amount of shift for anti-vibration in a telephoto end state.

Conditional Expression (1) is for achieving a decrease in size and an increase in performance by adjusting the light amount balance of the peripheral light amounts at the four corners of the image pickup surface of the image pickup device using the vertically movable lens group in the wide-angle end state and by appropriately setting the amounts of shift for anti-vibration using the vertically movable lens group in the wide-angle end state and the telephoto end state.

If the result value of Conditional Expression (1) is less than the lower limit thereof, in the optical adjustment method according to the embodiment of the invention, by adjusting the light amount balance in the wide-angle end state, it is necessary to decrease the amount of shift for anti-vibration of the vertically movable lens group in the direction substantially perpendicular to the optical axis with a view to further reliably achieving anti-vibration. However, as the amount of shift for anti-vibration decreases, an angle that enables correction of hand shake decreases by that amount. Hence, the image quality during hand shake is lowered.

Further, if the result value of Conditional Expression (1) is more than the upper limit thereof, the sum of the amount of shift for adjusting light amount balance of the vertically movable lens group and the amount of shift for anti-vibration in the wide-angle end state becomes excessively larger than the amount of shift for anti-vibration in the telephoto end state. Thus, the light amount balance is improved, but this causes an increase in size of the lens (an increase in the external diameter of the first lens group and the peripheral portion of the vertically movable lens group).

That is, in the optical adjustment method, the amounts of shift for anti-vibration using the vertically movable lens group in the wide-angle end state and the telephoto end state are appropriately set, thereby providing a difference (the amount of shift for anti-vibration in the wide-angle end state is smaller than the amount of shift for anti-vibration in the telephoto end state) to the amounts of shift for anti-vibration of the vertically movable lens group in the wide-angle end state and the telephoto end state.

With such a configuration, in the optical adjustment method, the difference of the amounts of shift for anti-vibration of the vertically movable lens group in the wide-angle end state and the telephoto end state can be used to adjust the light amount balance of the peripheral light amounts at the four corners of the image pickup surface of the image pickup device in the wide-angle end state. Therefore, it is possible to secure sufficient anti-vibration performance and improve the light amount balance while maintaining a small size.

According to the embodiment of the invention, the image capturing apparatus includes: at least one or more vertically movable lens groups among at least three or more lens groups, which constitute a zoom lens, movable in an optical axis direction, the vertically movable lens group being movable in a direction substantially perpendicular to the optical axis; a zoom lens group among the three or more lens groups, the zoom lens group being movable in the optical axis direction; and a correction mechanism that corrects a position of the optical axis based on the three or more lens groups by moving the vertically movable lens group in a wide-angle end state to a predetermined position in the substantially perpendicular direction. When the vertically movable lens group is moved for the purpose of anti-vibration at each zoom position in the substantially perpendicular direction, the apparatus is configured to satisfy the following Conditional Expression (1).

$$0.7<(Lw+Bw)/Bt<1.3, \qquad (1)$$

where

Lw is an amount of shift for correcting the position of the optical axis,

Bw is an amount of shift for anti-vibration in the wide-angle end state, and

Bt is an amount of shift for anti-vibration in a telephoto end state.

With such a configuration, in particular, it is possible to prevent the light amount from being lowered by improving the light amount balance of the peripheral light amounts at the four corners of the image pickup surface of the image pickup device in the wide-angle end state. As a result, it is possible to embody an image capturing apparatus with a simple configuration capable of achieving an increase in image quality.

Further, according to the another embodiment of the invention, the optical adjustment method is provided for the image capturing apparatus including at least one or more vertically movable lens groups among at least three or more lens groups, which constitute a zoom lens, movable in an optical axis direction, the vertically movable lens group being movable in a direction substantially perpendicular to the optical axis, a zoom lens group among the three or more lens groups, the zoom lens group being movable in the optical axis direction, and a correction mechanism that corrects a position of the optical axis based on the three or more lens groups by moving the vertically movable lens group in a wide-angle end state to a predetermined position in the substantially perpendicular direction. The optical adjustment method includes the step of moving the vertically movable lens group for the purpose of anti-vibration at each zoom position in the substantially perpendicular direction. In addition, the method is configured to satisfy the following Conditional Expression (1).

$$0.7<(Lw+Bw)/Bt<1.3, \qquad (1)$$

where

Lw is an amount of shift for correcting the position of the optical axis,

Bw is an amount of shift for anti-vibration in the wide-angle end state, and

Bt is an amount of shift for anti-vibration in a telephoto end state.

With such a configuration, in particular, it is possible to prevent the light amount from being lowered by improving the light amount balance of the peripheral light amounts at the four corners of the image pickup surface of the image pickup device in the wide-angle end state. As a result, it is possible to embody an optical adjustment method of achieving an increase in image quality.

BRIEF DESCRIPTION OF THE DRAWINGS

FIGS. 1A and 1B are schematic diagrams illustrating a concept of adjustment of light amount balance;

FIGS. 2A and 2B are schematic sectional views illustrating a configuration of a zoom lens according to a first numerical example;

FIG. 3 is a characteristic curve diagram illustrating an amount of shift for anti-vibration and an amount of shift for adjusting light amount balance during hand shake in the first numerical example;

FIG. 4 is a characteristic curve diagram illustrating aberrations in a wide-angle end state (ω=30.11 degrees) in the first numerical example;

FIG. 5 is a characteristic curve diagram illustrating aberrations in a middle focal length state (ω14.08 degrees) in the first numerical example;

FIG. 6 is a characteristic curve diagram illustrating aberrations in the telephoto end state (ω=9.82 degrees) in the first numerical example;

FIGS. 7A and 7B are schematic sectional views illustrating a configuration of a zoom lens according to a second numerical example;

FIG. 8 is a characteristic curve diagram illustrating an amount of shift for anti-vibration and an amount of shift for adjusting light amount balance during hand shake in the second numerical example;

FIG. 9 is a characteristic curve diagram illustrating aberrations in a wide-angle end state (ω=33.22 degrees) in the second numerical example;

FIG. 10 is a characteristic curve diagram illustrating aberrations in a middle focal length state (ω=18.66 degrees) in the second numerical example;

DESCRIPTION OF THE PREFERRED EMBODIMENTS

Figure 11:
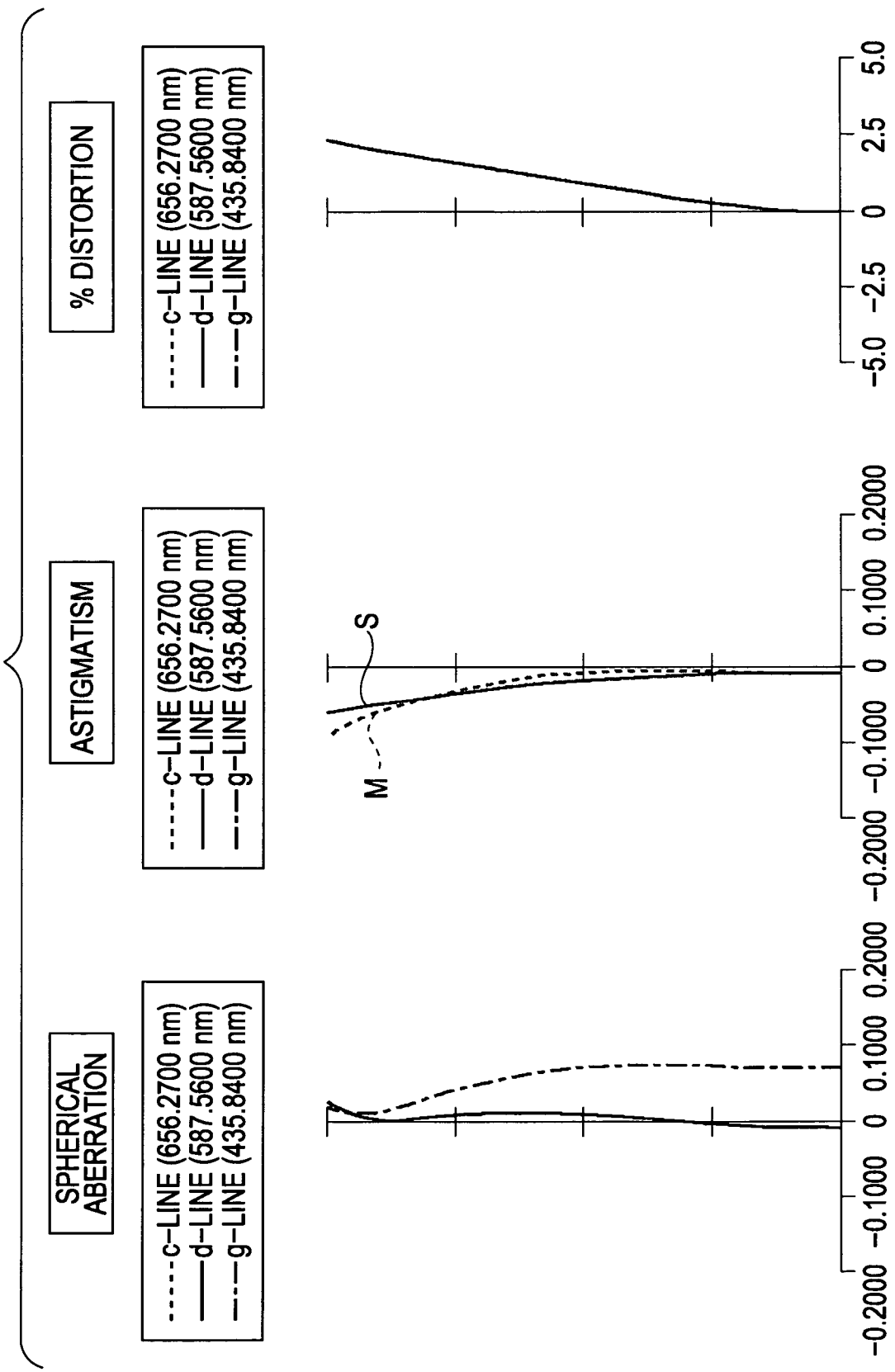
FIG. 11 is a characteristic curve diagram illustrating aberrations in the telephoto end state (ω=9.88 degrees) in the second numerical example.

Hereinafter, the preferred embodiments of the invention will be described. Furthermore, the description thereof will be given in the order of the following items.
1. Embodiment (Image Capturing Apparatus)
2. Numerical Example (First to Third Numerical Examples)
3. Configuration of Digital Camera
4. Other Embodiments 1. Embodiment 1-1. Configuration of Image Capturing Apparatus An image capturing apparatus according to an embodiment of the invention includes: at least one or more vertically movable lens groups among at least three or more lens groups, which constitute a zoom lens, movable in an optical axis direction, the vertically movable lens group being movable in a direction substantially perpendicular to the optical axis; a zoom lens group among the three or more lens groups, the zoom lens group being movable in the optical axis direction; and a correction mechanism that corrects a position of the optical axis based on the three or more lens groups by moving the vertically movable lens group in a wide-angle end state to a predetermined position in the substantially perpendicular direction. When the vertically movable lens group is moved for the purpose of anti-vibration at each zoom position in the substantially perpendicular direction, the apparatus is configured to satisfy the following Conditional Expression (1).

$$0.7<(Lw+Bw)/Bt<1.3, \qquad (1)$$

where $Lw$ is an amount of shift for correcting the position of the optical axis, $Bw$ is an amount of shift for anti-vibration in the wide-angle end state, and $Bt$ is an amount of shift for anti-vibration in a telephoto end state.

Conditional Expression (1) is for achieving a decrease in size and an increase in performance by adjusting the light amount balance of the peripheral light amounts at the four corners of the image pickup surface of the image pickup device using the vertically movable lens group in the wide-angle end state and by appropriately setting the amounts of shift for anti-vibration using the vertically movable lens group in the wide-angle end state and the telephoto end state.

If the result value of Conditional Expression (1) is less than the lower limit thereof, in the image capturing apparatus according to the embodiment of the invention, by adjusting the light amount balance in the wide-angle end state, it is necessary to decrease the amount of shift for anti-vibration of the vertically movable lens group in the direction substantially perpendicular to the optical axis with a view to further reliably achieving anti-vibration. However, as the amount of shift for anti-vibration decreases, an angle that enables correction of hand shake decreases by that amount. Hence, the image quality during hand shake is lowered.

Further, if the result value of Conditional Expression (1) is more than the upper limit thereof, the sum of the amount of shift for adjusting light amount balance of the vertically movable lens group and the amount of shift for anti-vibration in the wide-angle end state becomes excessively larger than the amount of shift for anti-vibration in the telephoto end state. Thus, the light amount balance is improved, but this causes an increase in size of the lens (an increase in the external diameter of the first lens group and the peripheral portion of the vertically movable lens group).

That is, in the image capturing apparatus, the amounts of shift for anti-vibration using the vertically movable lens group in the wide-angle end state and the telephoto end state are appropriately set, thereby providing a difference (the amount of shift for anti-vibration in the wide-angle end state is larger than the amount of shift for anti-vibration in the telephoto end state) to the amounts of shift for anti-vibration of the vertically movable lens group in the wide-angle end state and the telephoto end state.

With such a configuration, in the image capturing apparatus, the difference of the amounts of shift for anti-vibration of the vertically movable lens group in the wide-angle end state and the telephoto end state can be used to adjust the light amount balance of the peripheral light amounts at the four corners of the image pickup surface of the image pickup device in the wide-angle end state. Therefore, it is possible to secure sufficient anti-vibration performance and improve the light amount balance while maintaining a small size.

Further, the image capturing apparatus according to the embodiment includes: at least one or more vertically movable lens groups among at least three or more lens groups, which constitute a zoom lens, movable in an optical axis direction, the vertically movable lens group being movable in a direction substantially perpendicular to the optical axis; a zoom lens group among the lens groups, the zoom lens group being movable in the optical axis direction; and a correction mechanism that corrects a position of the optical axis based on the three or more lens groups by moving the vertically movable lens group in a wide-angle end state to a predetermined position in the substantially perpendicular direction. With such a configuration, the apparatus satisfies the following Conditional Expressions (2) and (3).

$$0.2<((1-\beta iw)\times\beta rw)/((1-\beta it)\times\beta rt)<0.7, \text{ and} \quad (2)$$

$$((1-\beta iw)\times\beta rw)>fw\times\tan 0.5, \quad (3)$$

where $\beta iw$ is a paraxial lateral magnification of the vertically movable lens group at the wide-angle end state, $\beta rw$ is a paraxial lateral magnification of a lens group disposed closer to the image pickup surface side than the vertically movable lens group in the wide-angle end state, $\beta it$ is a paraxial lateral magnification of the vertically movable lens group in the telephoto end state, $\beta rt$ is a paraxial lateral magnification of a lens group disposed closer to the image pickup surface side than the vertically movable lens group in the telephoto end state, and fw is a focal length in the wide-angle end state.

Conditional Expressions (2) and (3) are for embodying the image capturing apparatus in which the peripheral light amounts at the four corners of the image pickup surface of the image pickup device are balanced.

If the result value of Conditional Expression (2) is less than the lower limit thereof, the sensitivity of anti-vibration in the wide-angle end state is low relative to the telephoto end state (the amount of shift of the image pickup surface is small when the vertically movable lens group is moved by a unit length in the direction substantially perpendicular to the optical axis), and in order to obtain a certain effect of correction for anti-vibration, the amount of shift for anti-vibration of the vertically movable lens group should be increased.

Hence, when the result value of Conditional Expression (2) is less than the lower limit thereof, in order to adjust the light amount balance of the peripheral light amounts at the four corners of the image pickup surface of the image pickup device, the vertically movable lens group should be moved in the direction substantially perpendicular to the optical axis. In this case, it may be inevitable that the size of the lens of the vertically movable lens group increases.

That is, in the image capturing apparatus, if the result value of Conditional Expression (2) is more than the lower limit thereof, it is possible to set the anti-vibration position sensitivity appropriately in the wide-angle end state rather than the telephoto end state. Therefore, it is not necessary to increase the amount of shift for anti-vibration of the vertically movable lens group in order to obtain a certain effect of correction for anti-vibration. In addition, the size of the lens may not increase.

Furthermore, if the result value of Conditional Expression (2) is more than the upper limit thereof, it is necessary to keep the amount of mechanical stroke large with a view to securing a high zoom ratio and anti-vibration performance in the telephoto end state. Therefore, the size of the entire image capturing apparatus increases.

On the other hand, if the result value of Conditional Expression (3) is less than the lower limit thereof, in order to secure sufficient anti-vibration performance in the wide-angle end state and further adjust the light amount balance, the vertically movable lens group may be moved. In this case, the size of the entire image capturing apparatus increases.

Specifically, when the image capturing apparatus satisfies Conditional Expressions (2) and (3), it is possible to reduce the amount of shift for anti-vibration of the vertically movable lens group in the wide-angle end state rather than the amount of shift for anti-vibration of the vertically movable lens group in the telephoto end state. Therefore, it is possible to use effectively the extra amount of mechanical stroke in the wide-angle end state as the amount of shift for adjusting light amount balance at the time of adjusting the light amount balance.

Furthermore, it is preferable that the image capturing apparatus satisfy the following Conditional Expression (4).

$$((1-\beta it)\times\beta rt)/((1-\beta iw)\times\beta rw)<1.1\times(Bt/Bw) \quad (4)$$

In the image capturing apparatus, by satisfying Conditional Expression (4) and appropriately setting the ratio of the amounts of shift for anti-vibration in the telephoto end state and the wide-angle end state, it is possible to improve effectively the light amount balance of peripheral light amounts at the four corners of the image pickup surface of the image pickup device while achieving effective anti-vibration correction.

If the result value of Conditional Expression (4) is more than the upper limit, in the image capturing apparatus, an anti-vibration correction angle in the wide-angle end state becomes larger than the anti-vibration correction angle in the telephoto end state. However, usually brightness in the wide-angle end state becomes higher than that in the telephoto end state, and thus a shutter speed thereof is low, and the focal length thereof is short. As a result, hand shake has almost no influence thereon.

That is, considering a general photographing scene, in order to obtain a large correction angle set for anti-vibration and sufficient light amount balance in the wide-angle end state, it is difficult to avoid an increase in size of the lens.

Further, it is preferable that the image capturing apparatus satisfy the following Conditional Expression (5).

$$\alpha\times((1-\beta iw)\times\beta rw)/((1-\beta it)\times\beta rt)>1.33 \quad (5)$$

where $\alpha$ is a zoom ratio of the zoom lens group.

In the image capturing apparatus, by satisfying Conditional Expression (5), it is possible to prevent the peripheral light amounts at the four corners of the image pickup surface of the image pickup device in the wide-angle end state from being lowered while maintaining sufficient anti-vibration performance in both of the telephoto end state and the wide-angle end state.

If the result value of Conditional Expression (5) is less than the lower limit thereof, in a case where the anti-vibration correction angles in the wide-angle end state and the telephoto end state are set to be approximately equal to each other, a ratio of anti-vibration position sensitivities in the wide-angle end state and the telephoto end state is small. Hence, when sufficient anti-vibration performance is secured in the wide-angle end state and sufficient amount of shift for adjusting light amount balance is secured, the amount of shift becomes larger than the amount of shift for anti-vibration in the telephoto end state. As a result, the size of the apparatus increases.

As described above, in the image capturing apparatus according to the embodiment of the invention, the above mentioned Conditional Expressions (1) to (5) are satisfied. Thereby, as shown in FIG. 1A, the vertically movable lens group VG of the zoom lens ZL in the wide-angle end state is shifted by the correction mechanism in the direction substantially perpendicular to the optical axis direction in order to adjust the light amount balance. In this case, as shown in FIG. 1B, it is possible to equalize the light amount balance of the peripheral light amounts at the four corners of the image pickup surface of the image pickup device.

In this case, the image height at substantially the center of the image pickup surface of the image pickup device is 0%, for example, the image height at the left upper corner of the image pickup surface is 100%, and the image height at the left lower corner of the image pickup surface is −100%. Therefore, before the adjustment of light amount balance, the center-to-corner ratio at the left lower corner of the image pickup surface having the image height of −100% is low, and the center-to-corner ratio at the right upper corner of the image pickup surface having the image height of 100% is high.

In contrast, after the adjustment of light amount balance, by shifting the vertically movable lens group VG in the wide-angle end state in the optical axis direction, the center-to-corner ratio at the left lower corner of the image pickup surface having the image height of −100% is lowered, and the center-to-corner ratio at the right upper corner of the image pickup surface having the image height of 100% is slightly lowered. As a result, the light amount balance of the peripheral light amounts is equalized.

Furthermore, in the image capturing apparatus according to the embodiment of the invention, the vertically movable lens group VG of the zoom lens ZL in the wide-angle end state is shifted by the correction mechanism in the perpendicular direction. Thereby, it is possible to equalize the light amount balance of peripheral light amounts at the four corners of the image pickup surface of the image pickup device. As a result, it is possible to flexibly cope with the lowering in the peripheral light amounts caused when the size of the image pickup device is changed to be larger.

2. Numerical Examples

Next, numerical examples, in which specific numerical values are applied to the zoom lens used in the image capturing apparatus according to the embodiment of the invention, will be described with reference to the following drawings and tables. Here, in each numerical example, the aspheric surface is represented by the following Numerical Expression (1).

$$x = cy^2/(1+(1-(1+k)c^2y^2)^{1/2}) + Ay^4 + By^6 + \quad (1)$$

Here, y is a height from the optical axis, x is a sag amount, c is a curvature, k is a conic constant, and A, B ... are aspheric coefficients.

2-1. First Numerical Example

In FIGS. 2A and 2B, the reference sign 1 represents the zoom lens according to a first numerical example as a whole. FIG. 2A shows lens arrangement in the wide-angle end state. FIG. 2B shows lens arrangement in the telephoto end state.

The zoom lens 1 includes, in order from the object side, a first lens group G1 having a negative refractive power, a second lens group G2 having a positive refractive power, and a third lens group G3 having a positive refractive power.

The first lens group G1 of the zoom lens 1 includes a negative first lens L12 formed as a compound lens of a spherical glass lens L1 and a resin lens L2 and a second lens L3 formed as a positive glass lens having a meniscus shape, and has a negative power as a whole.

Further, in the zoom lens 1, the second lens group G2 includes a single lens L4 having a positive refractive power and a cemented lens of a positive lens L5 and a negative lens L6. The third lens group G3 includes a single lens L5 having a positive refractive power.

Furthermore, in the zoom lens 1, an aperture diaphragm S is disposed in the vicinity of the second lens group G2 so as to be close to the object side, and a seal glass SG for protecting a cut filter CF and an image pickup surface IMG is disposed between the third lens group G3 and the image pickup surface IMG of the image pickup device.

Here, the second lens group G2 serves as an anti-vibration lens group which can be moved by the correction mechanism such as an actuator in the direction substantially perpendicular to the optical axis, and is configured to prevent the peripheral light amount from being lowered by adjusting the balance of the peripheral light amounts on the image pickup surface IMG of the image pickup device.

As described above, since the zoom lens 1 has the above-mentioned lens element configuration, the zoom lens 1 is configured to be able to achieve a high zoom ratio and a wide angle and correct aberrations of the lens system satisfactorily.

The following Tables 1 to 5 show specific values of the first numerical example in the invention. In the specification tables in the first numerical example, f represents a focal length, FNO represents an F number, w represents a half angle of view, and the refractive indices are values at d-line (a wavelength of 587.6 nm). Furthermore, in the tables, the radius of curvature of INF means a flat surface.

TABLE 1

| f | 5.52 | 14.35 | 20.79 |
|---|---|---|---|
| FNO | 2.81 | 4.64 | 5.97 |
| ω (deg) | 30.11 | 14.08 | 9.82 |

TABLE 2

| SURFACE NUMBER | RADIUS OF CURVATURE | ON-AXIS SURFACE SPACING | RE-FRACTIVE INDEX | ABBE NUMBER |
|---|---|---|---|---|
| 1 | 218.5859 | 0.700 | 1.88300 | 40.8 |
| 2 | 8.2896 | 0.200 | 1.53420 | 41.7 |
| 3 | 6.6458 | 2.100 | | |
| 4 | 12.4028 | 1.800 | 1.92286 | 20.9 |
| 5 | 34.0870 | 18.550 | | |
| 6 APERTURE DIAPHRAGM | INFINITY INFINITY | 0.300 | | |
| 8 | 5.3761 | 1.632 | 1.69350 | 53.3 |
| 9 | −50.4856 | 0.100 | | |
| 10 | 10.6666 | 1.421 | 1.83481 | 42.7 |
| 11 | −15.4769 | 0.403 | 1.72825 | 28.3 |
| 12 | 3.6690 | 0.000 | | |
| 13 | INF | 5.056 | | |
| 14 | 27.0918 | 1.894 | 1.52470 | 56.2 |
| 15 | −12.3513 | 2.635 | | |
| 16 | INF | 0.300 | 1.51680 | 64.2 |
| 17 | INF | 0.150 | | |
| 18 | INF | 0.850 | | |
| 19 | INF | 0.500 | 1.61800 | 63.4 |
| 20 | INF | 0.600 | | |

Further, the third surface, the eighth surface, the ninth surface, the fourteenth surface, and the fifteenth surface are aspheric, and the aspheric coefficients thereof are shown in Table 3. Furthermore, for example, 0.26029 E-05 means $0.26029 \times 10^{-5}$.

TABLE 3

| SURFACE NUMBER | κ | A | B | C | D |
|---|---|---|---|---|---|
| 3 | 0.000000E+00 | −5.032116E−04 | −1.566169E−06 | −6.296946E−08 | −4.131763E−09 |
| 8 | 0.000000E+00 | −5.642369E−04 | 2.840627E−05 | −6.556837E−06 | 6.224282E−07 |
| 9 | 0.000000E+00 | 3.884155E−04 | 3.594826E−05 | −6.570794E−06 | 7.852812E−07 |
| 14 | 0.000000E+00 | 8.177874E−04 | −1.724223E−04 | 9.685148E−06 | −2.412672E−07 |
| 15 | 0.000000E+00 | 1.718332E−03 | −2.303302E−04 | 1.181360E−05 | −2.591639E−07 |

Subsequently, variable spaces, which are formed when the lens position state is changed in the zoom lens 1, are shown in the following Table 4.

TABLE 4

(VARIABLE SPACE TABLE)

| f | 5.52 | 14.35 | 20.79 |
|---|---|---|---|
| D5 | 18.55 | 3.86 | 1.01 |
| D13 | 5.06 | 14.65 | 21.11 |
| D15 | 2.64 | 2.17 | 1.80 |

Here, in the zoom lens 1, all of the first lens group G1, the second lens group G2 and the third lens group G3 are movable in the optical axis direction.

In the zoom lens 1, in the wide-angle end state, the space between the first lens group G1 and the second lens group G2 is widened, and the space between the second lens group G2 and the image pickup surface IMG is reduced, thereby making the principal point approach the image pickup surface IMG. In such a manner, a decrease in focal length is achieved.

Further, in the zoom lens 1, in the telephoto end state, the space between the first lens group G1 and the second lens group G2 is reduced, and the space between the second lens group G2 and the image pickup surface IMG is widened, thereby making the principal point far from the image pickup surface IMG. In such a manner, an increase in focal length is achieved.

Furthermore, in the zoom lens 1, by moving the second lens group G2 for anti-vibration in the direction substantially perpendicular to the optical axis, the deviation between the center position of the image pickup surface IMG and the optical axis of the zoom lens 1 is corrected, and fluctuation in focal position at the respective angles of view at the respective zoom points is absorbed. In such a manner, the zoom lens 1 is configured to secure high performance while maintaining a small size.

The following Table 5 shows values corresponding to the conditional expressions in the zoom lens 1 according to the first numerical example.

TABLE 5

| CONDITIONAL EXPRESSION 1 | 1.000 |
|---|---|
| CONDITIONAL EXPRESSION 2 | 0.511 |
| CONDITIONAL EXPRESSION 3 | 0.047 |
| CONDITIONAL EXPRESSION 4 | 1.956 |
| CONDITIONAL EXPRESSION 5 | 1.795 |

Thereby, in the zoom lens 1 according to the first numerical example, as can be seen from the values corresponding to the conditional expressions in Table 5, by satisfying the above-mentioned Conditional Expression (1), it is possible to provide a difference (the amount of shift for anti-vibration in the wide-angle end state is larger than the amount of shift for anti-vibration in the telephoto end state) to the amount of shift for anti-vibration of the second lens group G2 in the wide-angle end state and the telephoto end state.

Hence, in the zoom lens 1, the difference of the amounts of shift for anti-vibration in the wide-angle end state and the telephoto end state can be used to adjust the light amount balance of the peripheral light amounts at the four corners of the image pickup surface IMG of the image pickup device in the wide-angle end state. Therefore, it is possible to secure sufficient anti-vibration performance and improve the light amount balance while maintaining a small size.

In this case, in the zoom lens 1 as shown in FIG. 3, the amount of shift for anti-vibration (the amount of mechanical stroke) of the second lens group G2 in the telephoto end state is about 0.18 mm, while the amount of shift for anti-vibration of the second lens group G2 in the wide-angle end state is about 0.09 mm. Accordingly, it can be figured out that the amount of shift for anti-vibration in the wide-angle end state has only to be approximately a half of that in the telephoto end state.

Accordingly, in the zoom lens 1, the amount of shift of 0.09 mm, which is the extra amount of mechanical stroke in the wide-angle end state, can be used as the amount of shift for adjusting light amount balance. Therefore, it is possible to secure sufficient anti-vibration performance and improve the light amount balance while maintaining a small size.

Further, in the zoom lens 1 according to the first numerical example, as can be seen from the values corresponding to the conditional expressions in Table 5, by satisfying the above-mentioned Conditional Expressions (2) and (3), it is possible to set appropriately the anti-vibration position sensitivities using the second lens group G2 in the wide-angle end state and the telephoto end state.

With such a configuration, in the zoom lens 1, by providing the difference (the amount of shift for anti-vibration in the wide-angle end state is larger than the amount of shift for anti-vibration in the telephoto end state) to the amounts of shift for anti-vibration of the second lens group G2 in the wide-angle end state and the telephoto end state, the difference can be used to adjust the light amount balance of the peripheral light amounts at the four corners of the image pickup surface IMG of the image pickup device in the wide-angle end state. As a result, it is possible to secure sufficient anti-vibration performance and improve the light amount balance while maintaining a small size.

Furthermore, in the zoom lens 1, as can be seen from the values corresponding to the conditional expressions in Table 5, by satisfying the above-mentioned Conditional Expression (4) and appropriately setting the ratio of the amounts of shift for anti-vibration in the telephoto end state and the wide-angle end state, it is possible to effectively improve the light amount balance of peripheral light amounts at the four corners of the image pickup surface IMG of the image pickup device while achieving effective anti-vibration correction without increasing the size of the lens. Furthermore, in the zoom lens 1, as can be seen from the values corresponding to the conditional expressions in Table 5, by satisfying the above-mentioned Conditional Expression (5), even when the anti-vibration correction angles in the wide-angle end state and the telephoto end state are set to be approximately the same, it is possible to increase the ratio of the anti-vibration position sensitivities in the wide-angle end state and the telephoto end state.

With such a configuration, even when securing sufficient anti-vibration performance in the wide-angle end state and securing the amount of shift for sufficiently adjusting light amount balance, the zoom lens 1 is able to prevent the peripheral light amounts from being lowered at the four corners of the image pickup surface IMG of the image pickup device in the wide-angle end state while maintaining sufficient anti-vibration performance in both of the telephoto end state and the wide-angle end state without making the amount of shift larger than the amount of shift for anti-vibration in the telephoto end state.

Subsequently, FIG. 4 shows diagrams of aberrations in the wide-angle end state ($\omega$=30.11 degrees) in a condition where the focus of the zoom lens 1 according to the first numerical example is at infinity. FIG. 5 shows diagrams of aberrations in the middle focal length state ($\omega$=14.08 degrees) in the condition. FIG. 6 shows diagrams of aberrations in the telephoto end state ($\omega$=9.82 degrees) in the condition. Furthermore, the aberrations correspond to the d-line with a wavelength of 587.56 nm.

In FIGS. 4 to 6, the solid line of each spherical aberration diagram represents spherical aberration, the solid line in each astigmatism diagram represents a sagittal image pickup surface, the dashed line represents a meridional image pickup surface, and the solid line in the distortion diagram represents distortion. It can be seen from the aberration diagrams that the zoom lens 1 according to the first numerical example has an excellent imaging performance by satisfactorily correcting the aberrations while having a high zoom ratio.

2-2. Second Numerical Example

In FIGS. 7A and 7B, the reference sign 2 represents the zoom lens according to a second numerical example as a whole. FIG. 7A shows lens arrangement in the wide-angle end state. FIG. 7B shows lens arrangement in the telephoto end state.

The zoom lens 2 includes, in order from the object side, a first lens group G1 having a negative refractive power, a second lens group G2 having a positive refractive power, and a third lens group G3 having a positive refractive power.

The first lens group G1 of the zoom lens 2 includes a negative first lens L21 of which both surfaces are aspheric and a second lens L22 formed as a positive glass lens having a meniscus shape, and has a negative power as a whole.

Further, in the zoom lens 2, the second lens group G2 includes a single lens L23 having a positive refractive power and a cemented lens of a positive lens L24 and a negative lens L25. The third lens group G3 includes a single lens L26 having a positive refractive power.

Furthermore, in the zoom lens 2, an aperture diaphragm S is disposed in the vicinity of the second lens group G2 so as to be close to the object side, and a seal glass SG for protecting a cut filter CF and an image pickup surface IMG is disposed between the third lens group G3 and the image pickup surface IMG of the image pickup device.

Here, the second lens group G2 serves as an anti-vibration lens group which can be moved by the correction mechanism such as an actuator in the direction substantially perpendicular to the optical axis, and is configured to prevent the peripheral light amount from being lowered by adjusting the balance of the peripheral light amounts on the image pickup surface IMG of the image pickup device.

As described above, since the zoom lens 2 has the above-mentioned lens element configuration, the zoom lens 2 is configured to be able to achieve a high zoom ratio and a wide angle and correct aberrations of the lens system satisfactorily.

The following Tables 6 to 10 show specific values of the second numerical example in the invention. In the specification tables in the second numerical example, f represents a focal length, FNO represents an F number, w represents a half angle of view, and the refractive indices are values at d-line (a wavelength of 587.6 nm). Furthermore, in the tables, the radius of curvature of INF means a flat surface.

TABLE 6

| f | 5.50 | 10.66 | 20.67 |
| FNO | 2.85 | 3.85 | 5.94 |
| $\omega$ | 33.22 | 18.66 | 9.88 |

TABLE 7

| SURFACE NUMBER | RADIUS OF CURVATURE | ON-AXIS SURFACE SPACING | RE-FRACTIVE INDEX | ABBE NUMBER |
| --- | --- | --- | --- | --- |
| 1 | 37.1862 | 0.800 | 1.851350 | 40.1 |
| 2 | 6.2861 | 2.139 | | |
| 3 | 9.7853 | 1.561 | 1.922860 | 20.9 |
| 4 | 16.9693 | 17.517 | | |
| 5 | INF | 0.300 | | |
| APERTURE DIAPHRAGM | INF | | | |
| 7 | 5.9394 | 1.498 | 1.693500 | 53.2 |
| 8 | −41.1103 | 0.213 | | |
| 9 | 8.8524 | 1.339 | 1.834810 | 42.7 |
| 10 | −10.6512 | 0.450 | 1.717360 | 29.5 |
| 11 | 3.6017 | 0.000 | | |
| 12 | INF | 4.887 | | |
| 13 | 18.5087 | 1.600 | 1.524700 | 56.2 |
| 14 | −20.5947 | 2.614 | | |
| 15 | INF | 0.300 | 1.516798 | 64.2 |
| 16 | INF | 0.720 | | |
| 17 | INF | 0.500 | 1.617998 | 63.4 |
| 18 | INF | 0.600 | | |

Furthermore, the first surface, the second surface, the seventh surface, the eighth surface, the thirteenth surface, and the fourteenth surface are aspheric, and the aspheric coefficients thereof are shown in Table 8. Furthermore, for example, 0.26029 E-05 means $0.26029 \times 10^{-5}$.

TABLE 8

| SURFACE NUMBER | κ | A | B | C | D |
| --- | --- | --- | --- | --- | --- |
| 1 | 0.000000E+00 | −1.710695E−04 | 1.110662E−05 | −2.439607E−07 | 1.951499E−09 |
| 2 | 0.000000E+00 | −4.465078E−04 | 7.920567E−06 | −1.911366E−08 | −1.058835E−08 |
| 7 | 0.000000E+00 | −8.511078E−04 | 6.341780E−06 | −8.386138E−06 | 3.320691E−07 |
| 8 | 0.000000E+00 | −1.554336E−04 | 2.356039E−05 | −1.218046E−05 | 7.624626E−07 |
| 13 | 0.000000E+00 | 4.966900E−04 | −7.771628E−05 | 4.168796E−06 | −7.485177E−08 |
| 14 | 0.000000E+00 | 1.147804E−03 | −1.346748E−04 | 7.086259E−06 | −1.314472E−07 |

Subsequently, variable spaces, which are formed when the lens position is changed in the zoom lens 2, are shown in the following Table 9.

TABLE 9

(VARIABLE SPACE TABLE)

| f | 5.497 | 10.659 | 20.668 |
| --- | --- | --- | --- |
| D4 | 17.517 | 6.059 | 0.700 |
| D12 | 4.887 | 9.589 | 19.387 |
| D14 | 2.614 | 2.697 | 1.649 |

Here, in the zoom lens 2, all of the first lens group G1, the second lens group G2 and the third lens group G3 are movable in the optical axis direction.

In the zoom lens 2, in the wide-angle end state, the space between the first lens group G1 and the second lens group G2 is widened, and the space between the second lens group G2 and the image pickup surface IMG is reduced, thereby making the principal point approach the image pickup surface IMG. In such a manner, a decrease in focal length is achieved.

Further, in the zoom lens 2, in the telephoto end state, the space between the first lens group G1 and the second lens group G2 is reduced, and the space between the second lens group G2 and the image pickup surface IMG is widened, thereby making the principal point far from the image pickup surface IMG. In such a manner, an increase in focal length is achieved.

Furthermore, in the zoom lens 2, by moving the second lens group G2 for anti-vibration in the direction substantially perpendicular to the optical axis, the deviation between the center position of the image pickup surface IMG and the optical axis of the zoom lens 2 is corrected, and fluctuation in focal position at the respective angles of view at the respective zoom points is absorbed. In such a manner, the zoom lens 2 is configured to secure high performance while maintaining a small size.

The following Table 10 shows values corresponding to the conditional expressions in the zoom lens 2 according to the second numerical example.

TABLE 10

| CONDITIONAL EXPRESSION 1 | 1.000 |
| --- | --- |
| CONDITIONAL EXPRESSION 2 | 0.519 |
| CONDITIONAL EXPRESSION 3 | 0.044 |
| CONDITIONAL EXPRESSION 4 | 1.926 |
| CONDITIONAL EXPRESSION 5 | 1.952 |

Thereby, in the zoom lens 2 according to the second numerical example, as can be seen from the values corresponding to the conditional expressions in Table 10, by satisfying the above-mentioned Conditional Expression (1), it is possible to provide a difference (the amount of shift for anti-vibration in the wide-angle end state is larger than the amount of shift for anti-vibration in the telephoto end state) to the amount of shift for anti-vibration of the second lens group G2 in the wide-angle end state and the telephoto end state.

Hence, in the zoom lens 2, the difference of the amounts of shift for anti-vibration in the wide-angle end state and the telephoto end state can be used to adjust the light amount balance of the peripheral light amounts at the four corners of the image pickup surface of the image pickup device in the wide-angle end state. Therefore, it is possible to secure sufficient anti-vibration performance and improve the light amount balance while maintaining a small size.

In this case, in the zoom lens 2 as shown in FIG. 8, the amount of shift for anti-vibration (the amount of mechanical stroke) of the second lens group G2 in the telephoto end state is about 0.17 mm, while the amount of shift for anti-vibration of the second lens group G2 in the wide-angle end state is about 0.085 mm. Accordingly, it can be figured out that the amount of shift for anti-vibration in the wide-angle end state has only to be approximately a half of that in the telephoto end state.

Accordingly, in the zoom lens 2, the amount of shift of 0.085 mm, which is the extra amount of mechanical stroke in the wide-angle end state, can be used as the amount of shift for adjusting light amount balance. Therefore, it is possible to secure sufficient anti-vibration performance and improve the light amount balance while maintaining a small size.

Further, in the zoom lens 2 according to the second numerical example, as can be seen from the values corresponding to the conditional expressions in Table 10, by satisfying the above-mentioned Conditional Expressions (2) and (3), it is possible to set appropriately the anti-vibration position sensitivities using the second lens group G2 in the wide-angle end state and the telephoto end state.

With such a configuration, in the zoom lens 2, by providing the difference (the amount of shift for anti-vibration in the wide-angle end state is larger than the amount of shift for anti-vibration in the telephoto end state) to the amounts of shift for anti-vibration of the second lens group G2 in the wide-angle end state and the telephoto end state, the difference can be used to adjust the light amount balance of the peripheral light amounts at the four corners of the image pickup surface IMG of the image pickup device in the wide-angle end state. As a result, it is possible to secure sufficient anti-vibration performance and improve the light amount balance while maintaining a small size.

Furthermore, in the zoom lens 2, as can be seen from the values corresponding to the conditional expressions in Table 10, by satisfying the above-mentioned Conditional Expression (4) and appropriately setting the ratio of the amounts of shift for anti-vibration in the telephoto end state and the wide-angle end state, it is possible to improve effectively the light amount balance of peripheral light amounts at the four corners of the image pickup surface IMG of the image pickup device while achieving effective anti-vibration correction without increasing the size of the lens.

Furthermore, in the zoom lens 2, as can be seen from the values corresponding to the conditional expressions in Table 10, by satisfying the above-mentioned Conditional Expression (5), even when the anti-vibration correction angles in the wide-angle end state and the telephoto end state are set to be approximately the same, it is possible to increase the ratio of the anti-vibration position sensitivities in the wide-angle end state and the telephoto end state.

With such a configuration, even when securing sufficient anti-vibration performance in the wide-angle end state and securing the amount of shift for sufficiently adjusting light amount balance, the zoom lens 2 is able to prevent the peripheral light amounts from being lowered at the four corners of the image pickup surface IMG of the image pickup device in the wide-angle end state while maintaining sufficient anti-vibration performance in both of the telephoto end state and the wide-angle end state without making the amount of shift larger than the amount of shift for anti-vibration in the telephoto end state.

Subsequently, FIG. 9 shows diagrams of aberrations in the wide-angle end state ($\omega$=33.22 degrees) in a condition where the focus of the zoom lens 2 according to the second numerical example is at infinity. FIG. 10 shows diagrams of aberrations in the middle focal length state ($\omega$=18.66 degrees) in the condition. FIG. 11 shows diagrams of aberrations in the telephoto end state ($\omega$=9.88 degrees) in the condition. Furthermore, the aberrations correspond to the d-line with a wavelength of 587.56 nm.

In FIGS. 9 to 11, the solid line of each spherical aberration diagram represents spherical aberration, the solid line in each astigmatism diagram represents a sagittal image pickup surface, the dashed line represents a meridional image pickup surface, and the solid line in the distortion diagram represents distortion. It can be seen from the aberration diagrams that the zoom lens 2 according to the second numerical example has an excellent imaging performance by satisfactorily correcting the aberrations while having a high zoom ratio.

2-3. Third Numerical Example

Figure 12A:
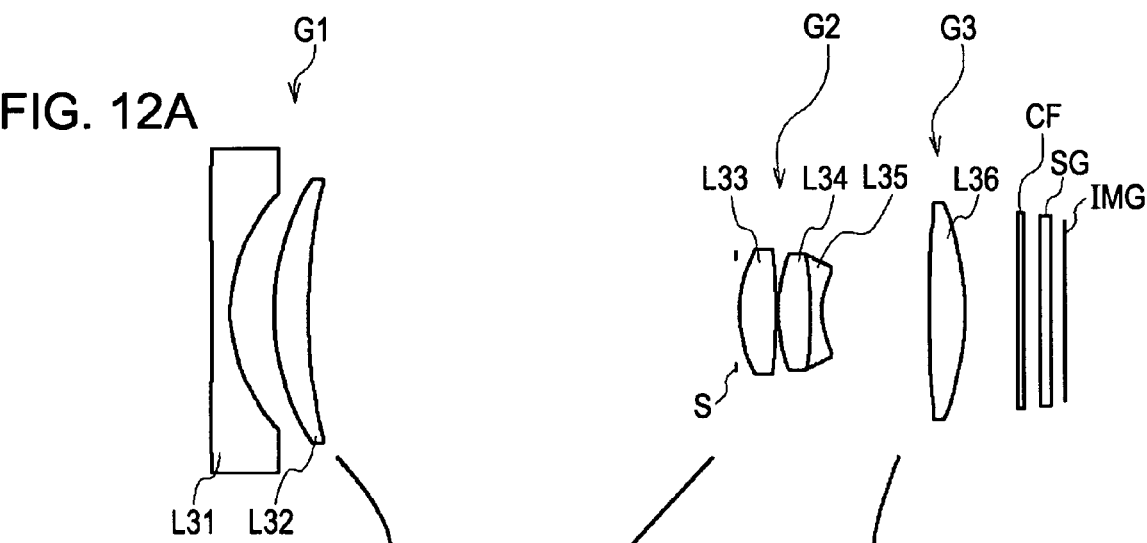
FIGS. 12A and 12B are schematic sectional views illustrating a configuration of a zoom lens according to a third numerical example.
Figure 12B:
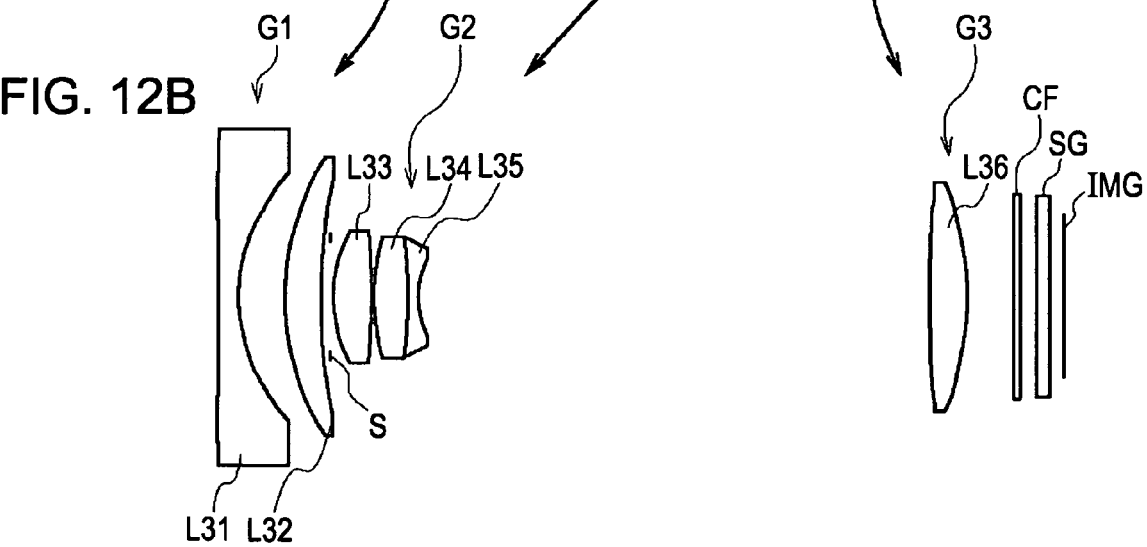

In FIGS. 12A and 12B, the reference sign 3 represents the zoom lens according to a third numerical example as a whole. FIG. 12A shows lens arrangement in the wide-angle end state. FIG. 12B shows lens arrangement in the telephoto end state.

The zoom lens 3 includes, in order from the object side, a first lens group G1 having a negative refractive power, a second lens group G2 having a positive refractive power, and a third lens group G3 having a positive refractive power.

The first lens group G1 of the zoom lens 3 includes a negative first lens L31 of which both surfaces are aspheric and a second lens L32 formed as a positive glass lens having a meniscus shape, and has a negative power as a whole.

Further, in the zoom lens 3, the second lens group G2 includes a single lens L33 having a positive refractive power and a cemented lens of a positive lens L34 and a negative lens L35. The third lens group G3 includes a single lens L36 having a positive refractive power.

Furthermore, in the zoom lens 3, an aperture diaphragm S is disposed in the vicinity of the second lens group G2 so as to be close to the object side, and a seal glass SG for protecting a cut filter CF and an image pickup surface IMG is disposed between the third lens group G3 and the image pickup surface IMG of the image pickup device.

Here, the second lens group G2 serves as an anti-vibration lens group which can be moved by the correction mechanism such as an actuator in the direction substantially perpendicular to the optical axis, and is configured to prevent the peripheral light amount from being lowered by adjusting the balance of the peripheral light amounts on the image pickup surface IMG of the image pickup device.

As described above, since the zoom lens' 3 has the above-mentioned lens element configuration, the zoom lens 3 is configured to be able to achieve a high zoom ratio and a wide angle and correct aberrations of the lens system satisfactorily.

The following Tables 11 to 15 show specific values of the third numerical example in the invention. In the specification tables in the third numerical example, f represents a focal length, FNO represents an F number, $\omega$ represents a half angle of view, and the refractive indices are values at d-line (a wavelength of 587.6 nm). Furthermore, in the tables, the radius of curvature of INF means a flat surface.

TABLE 11

| f | 4.89 | 13.20 | 22.01 |
|---|---|---|---|
| FNO | 2.75 | 4.53 | 6.35 |
| $\omega$ | 36.36 | 15.25 | 9.29 |

TABLE 12

| SURFACE NUMBER | RADIUS OF CURVATURE | ON-AXIS SURFACE SPACING | RE-FRACTIVE INDEX | ABBE NUMBER |
|---|---|---|---|---|
| 1 | −211.833 | 0.8 | 1.85549 | 40.30474 |
| 2 | 7.12911 | 1.94576 | | |
| 3 | 11.30889 | 1.46 | 1.933229 | 20.87966 |
| 4 | 25.45898 | 18.48792 | | |
| 5 | INF | 0.3 | | |
| APERTURE DIAPHRAGM | INF | 0.1 | | |
| 7 | 5.51458 | 1.6 | 1.696607 | 53.19883 |
| 8 | −32.2495 | 0.1 | | |
| 9 | 8.76952 | 1.41 | 1.839442 | 42.71876 |
| 10 | −22.3981 | 0.44 | 1.747067 | 27.75875 |
| 11 | 3.46321 | 0 | | |
| 12 | INFINITY | 4.747369 | | |
| 13 | 80 | 1.6 | 1.5269 | 56.23794 |
| 14 | −9.908 | 2.288953 | | |
| 15 | INF | 0.3 | 1.51872 | 64.19054 |
| 16 | INF | 0.72 | | |
| 17 | INF | 0.5 | 1.620325 | 63.20937 |
| 18 | INF | 0.6 | | |

Furthermore, the first surface, the second surface, the seventh surface, the eighth surface, the thirteenth surface, and the fourteenth surface are aspheric, and the aspheric coefficients thereof are shown in Table 13. Furthermore, for example, 0.26029 E−05 means $0.26029 \times 10^{-5}$.

TABLE 13

| SURFACE NUMBER | κ | A | B | C | D |
|---|---|---|---|---|---|
| 1 | 0.000000E+00 | −1.020974E−04 | 7.961382E−06 | −1.534908E−07 | 1.072660E−09 |
| 2 | 0.000000E+00 | −3.377104E−04 | 7.660762E−06 | −9.069030E−08 | −2.703027E−09 |

TABLE 13-continued

| SURFACE NUMBER | κ | A | B | C | D |
|---|---|---|---|---|---|
| 7 | 0.000000E+00 | −7.125828E−04 | 8.878924E−07 | −4.377831E−06 | 9.115721E−08 |
| 8 | 0.000000E+00 | 1.749527E−04 | 1.532235E−05 | −6.182494E−06 | 2.365639E−07 |
| 13 | 0.000000E+00 | −3.967536E−05 | −2.013543E−05 | 4.426852E−06 | −1.419544E−07 |
| 14 | 0.000000E+00 | 8.558372E−04 | −7.229597E−05 | 8.135524E−06 | −2.466572E−07 |

Subsequently, variable spaces, which are formed when the lens position state is changed in the zoom lens 3, are shown in the following Table 14.

TABLE 14

(VARIABLE SPACE TABLE)

| f | 4.8904 | 13.204 | 22.0067 |
|---|---|---|---|
| D4 | 18.488 | 3.752 | 0.149 |
| D12 | 4.747 | 13.014 | 21.233 |
| D14 | 2.289 | 1.971 | 1.900 |

Here, in the zoom lens 3, all of the first lens group G1, the second lens group G2 and the third lens group G3 are movable in the optical axis direction.

In the zoom lens 3, in the wide-angle end state, the space between the first lens group G1 and the second lens group G2 is widened, and the space between the second lens group G2 and the image pickup surface IMG is reduced, thereby making the principal point approach the image pickup surface IMG. In such a manner, a decrease in focal length is achieved.

Further, in the zoom lens 3, in the telephoto end state, the space between the first lens group G1 and the second lens group G2 is reduced, and the space between the second lens group G2 and the image pickup surface IMG is widened, thereby making the principal point far from the image pickup surface IMG. In such a manner, an increase in focal length is achieved.

Furthermore, in the zoom lens 3, by moving the second lens group G2 for anti-vibration in the direction substantially perpendicular to the optical axis, the deviation between the center position of the image pickup surface IMG and the optical axis of the zoom lens 3 is corrected, and fluctuation in focal position at the respective angles of view at the respective zoom points is absorbed. In such a manner, the zoom lens 3 is configured to secure high performance while maintaining a small size.

The following Table 15 shows values corresponding to the conditional expressions in the zoom lens 3 according to the third numerical example.

TABLE 15

| CONDITIONAL EXPRESSION 1 | 1.000 |
|---|---|
| CONDITIONAL EXPRESSION 2 | 0.476 |
| CONDITIONAL EXPRESSION 3 | 0.040 |
| CONDITIONAL EXPRESSION 4 | 1.035 |
| CONDITIONAL EXPRESSION 5 | 2.142 |

Thereby, in the zoom lens 3 according to the third numerical example, as can be seen from the values corresponding to the conditional expressions in Table 15, by satisfying the above-mentioned Conditional Expression (1), it is possible to provide a difference (the amount of shift for anti-vibration in the wide-angle end state is larger than the amount of shift for anti-vibration in the telephoto end state) to the amount of shift for anti-vibration of the second lens group G2 in the wide-angle end state and the telephoto end state.

Hence, in the zoom lens 3, the difference of the amounts of shift for anti-vibration in the wide-angle end state and the telephoto end state can be used to adjust the light amount balance of the peripheral light amounts at the four corners of the image pickup surface IMG of the image pickup device in the wide-angle end state. Therefore, it is possible to secure sufficient anti-vibration performance and improve the light amount balance while maintaining a small size.

Figure 13:
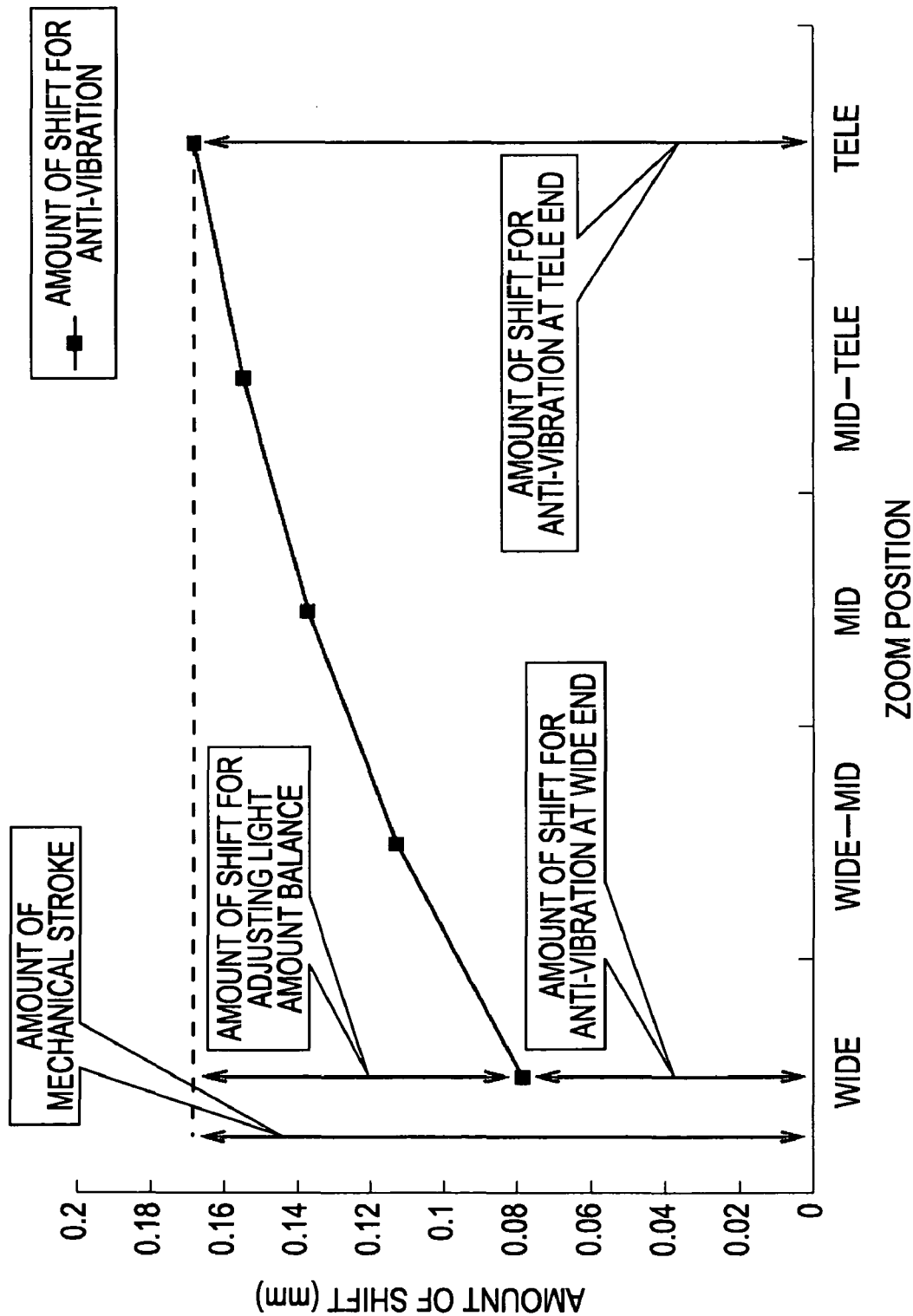
FIG. 13 is a characteristic curve diagram illustrating an amount of shift for anti-vibration and an amount of shift for adjusting light amount balance during hand shake in the third numerical example.

In this case, in the zoom lens 3 as shown in FIG. 13, the amount of shift for anti-vibration (the amount of mechanical stroke) of the second lens group G2 in the telephoto end state is about 0.17 mm, while the amount of shift for anti-vibration of the second lens group G2 in the wide-angle end state is about 0.08 mm. Accordingly, it can be figured out that the amount of shift for anti-vibration in the wide-angle end state has only to be approximately a half of that in the telephoto end state.

Accordingly, in the zoom lens 3, the amount of shift of 0.08 mm, which is the extra amount of mechanical stroke in the wide-angle end state, can be used as the amount of shift for adjusting light amount balance. Therefore, it is possible to secure sufficient anti-vibration performance and improve the light amount balance while maintaining a small size.

Further, in the zoom lens 3 according to the third numerical example, as can be seen from the values corresponding to the conditional expressions in Table 15, by satisfying the above-mentioned Conditional Expressions (2) and (3), it is possible to set appropriately the anti-vibration position sensitivities using the second lens group G2 in the wide-angle end state and the telephoto end state.

With such a configuration, in the zoom lens 3, by providing the difference (the amount of shift for anti-vibration in the wide-angle end state is larger than the amount of shift for anti-vibration in the telephoto end state) to the amounts of shift for anti-vibration of the second lens group G2 in the wide-angle end state and the telephoto end state, the difference can be used to adjust the light amount balance of the peripheral light amounts at the four corners of the image pickup surface IMG of the image pickup device in the wide-angle end state. As a result, it is possible to secure sufficient anti-vibration performance and improve the light amount balance while maintaining a small size.

Furthermore, in the zoom lens 3, as can be seen from the values corresponding to the conditional expressions in Table 15, by satisfying the above-mentioned Conditional Expression (4) and appropriately setting the ratio of the amounts of shift for anti-vibration in the telephoto end state and the wide-angle end state, it is possible to improve effectively the light amount balance of peripheral light amounts at the four corners of the image pickup surface IMG of the image pickup device while achieving effective anti-vibration correction without increasing the size of the lens.

Furthermore, in the zoom lens 3, as can be seen from the values corresponding to the conditional expressions in Table 15, by satisfying the above-mentioned Conditional Expression (5), even when the anti-vibration correction angles in the wide-angle end state and the telephoto end state are set to be approximately the same, it is possible to increase the ratio of the anti-vibration position sensitivities in the wide-angle end state and the telephoto end state.

With such a configuration, even when securing sufficient anti-vibration performance in the wide-angle end state and securing the amount of shift for sufficiently adjusting light amount balance, the zoom lens 3 is able to prevent the peripheral light amounts from being lowered at the four corners of the image pickup surface IMG of the image pickup device in the wide-angle end state while maintaining sufficient anti-vibration performance in both of the telephoto end state and the wide-angle end state without making the amount of shift larger than the amount of shift for anti-vibration in the telephoto end state.

Figure 14:
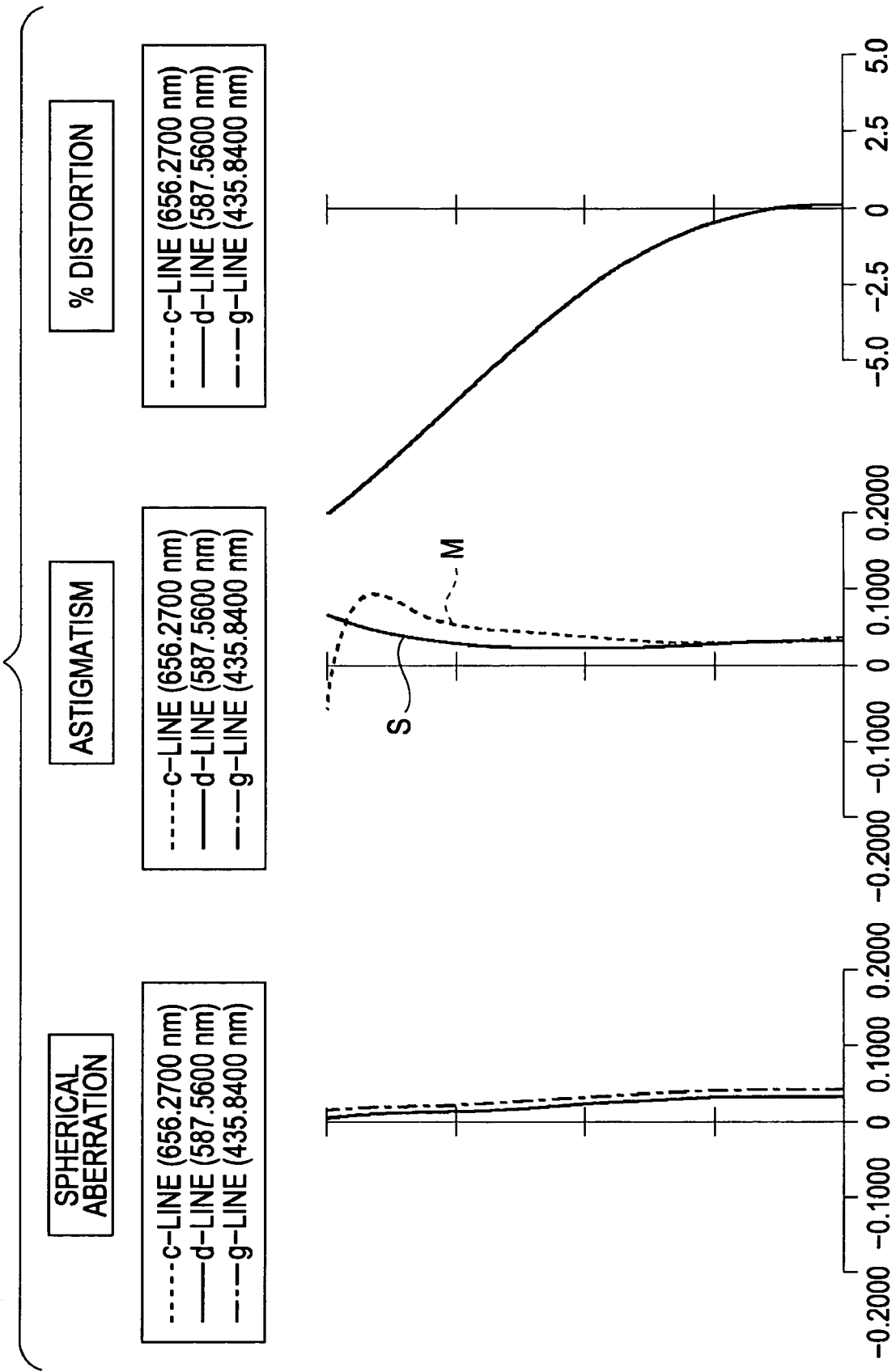
FIG. 14 is a characteristic curve diagram illustrating aberrations in a wide-angle end state (ω=36.36 degrees) in the third numerical example.
Figure 15:
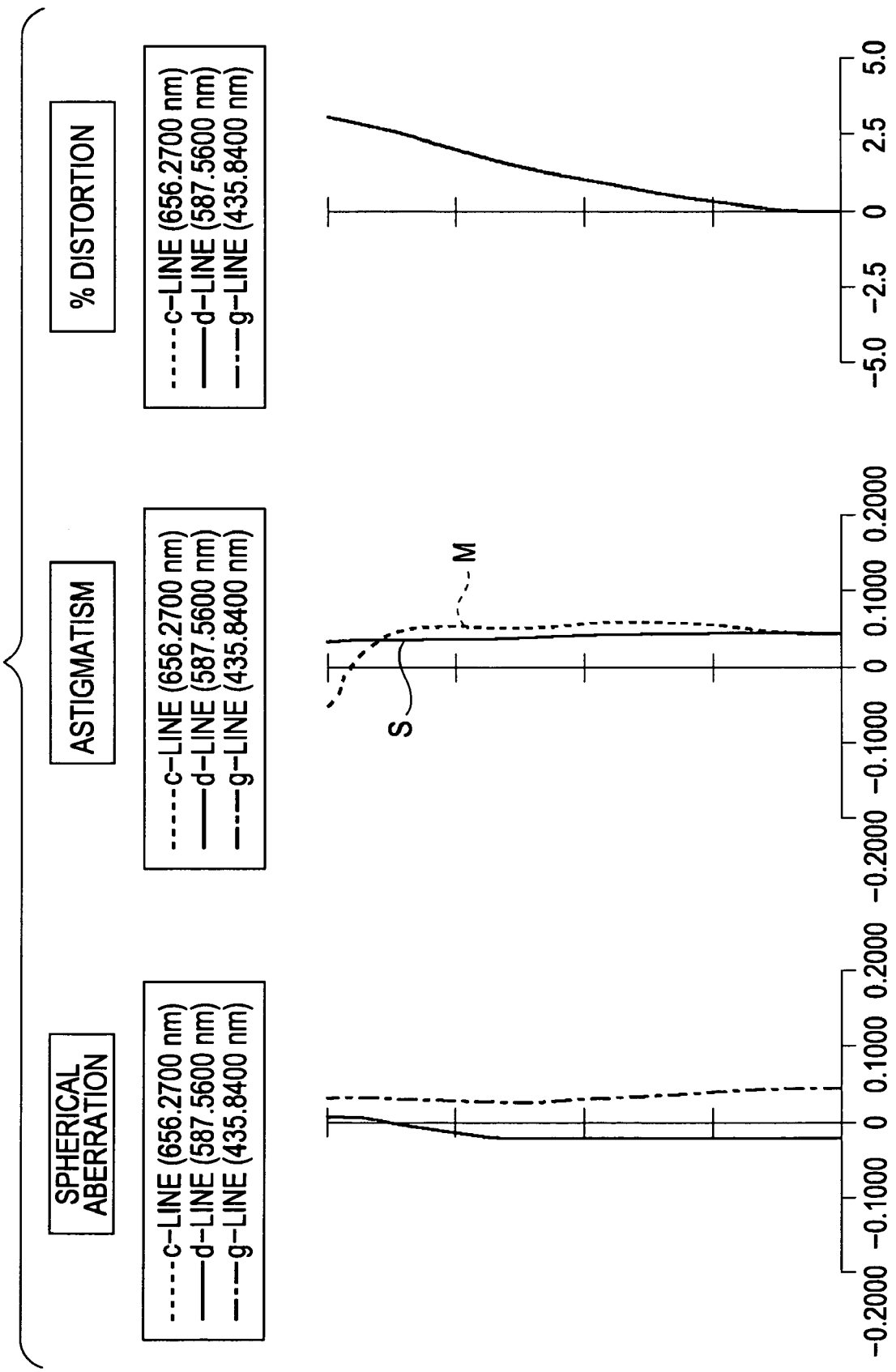
FIG. 15 is a characteristic curve diagram illustrating aberrations in a middle focal length state (ω=15.25 degrees) in the third numerical example.
Figure 16:
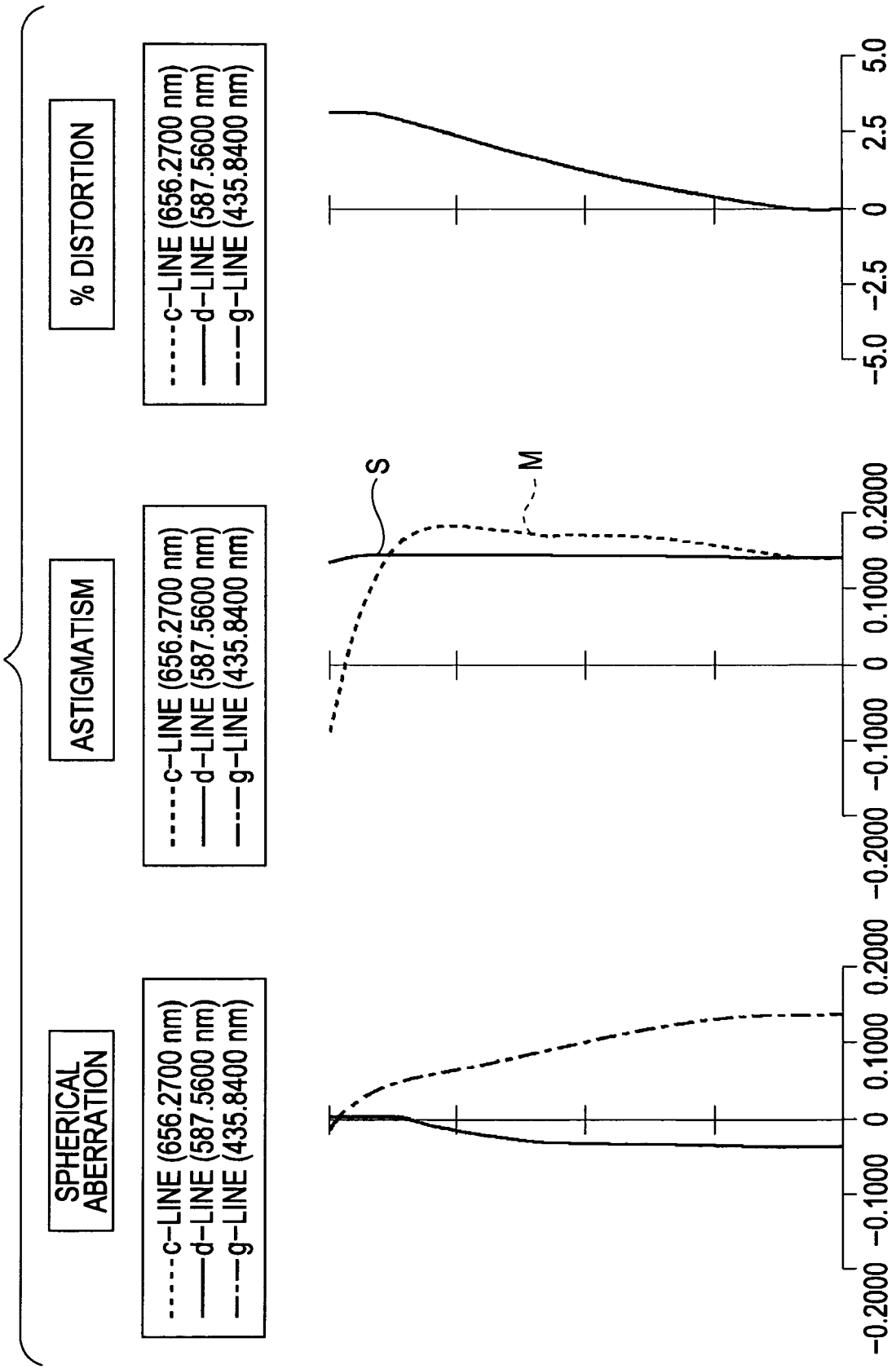
FIG. 16 is a characteristic curve diagram illustrating aberrations in the telephoto end state (ω=9.29 degrees) in the third numerical example.

Subsequently, FIG. 14 shows diagrams of aberrations in the wide-angle end state ($\omega$=36.36 degrees) in a condition where the focus of the zoom lens 3 according to the third numerical example is at infinity. FIG. 15 shows diagrams of aberrations in the middle focal length state ($\omega$=15.25 degrees) in the condition. FIG. 16 shows diagrams of aberrations in the telephoto end state ($\omega$=9.29 degrees) in the condition. Furthermore, the aberrations correspond to the d-line with a wavelength of 587.56 nm.

In FIGS. 14 to 16, the solid line of each spherical aberration diagram represents spherical aberration, the solid line in each astigmatism diagram represents a sagittal image pickup surface, the dashed line represents a meridional image pickup surface, and the solid line in the distortion diagram represents distortion. It can be seen from the aberration diagrams that the zoom lens 3 according to the third numerical example has an excellent imaging performance by satisfactorily correcting the aberrations while having a high zoom ratio.

3. Configuration of Digital Camera

Figure 17:
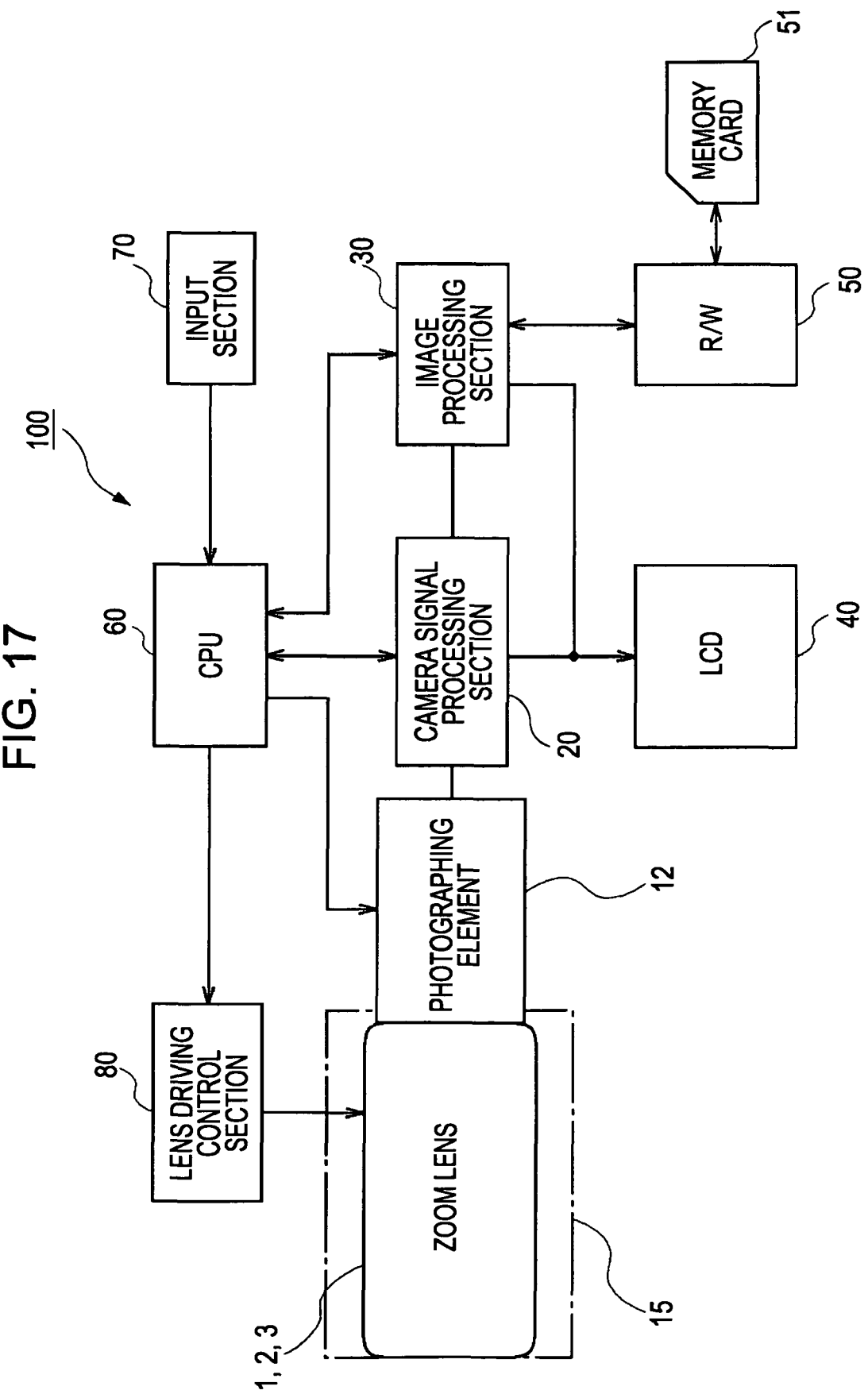
FIG. 17 is a schematic block diagram illustrating a digital camera equipped with an image capturing apparatus according to an embodiment of the invention.

As shown in FIG. 17, a digital camera 100 equipped with the image capturing apparatus including the above-mentioned zoom lens 1, 2, or 3 has a camera block 15 having a function of capturing an image and a camera signal processing section 20 for performing signal processing such as analog/digital conversion processing on a signal of an image captured by the camera block 15.

Further, the digital camera 100 has an image processing section 30 for performing recording/reproducing processing of the image signal, an LCD (Liquid Crystal Display) 40 for displaying the captured image and the like, and a reader writer 50 for performing writing/reading on a memory card 51.

Furthermore, the digital camera 100 has a CPU (Central Processing Unit) 60 for controlling the entire camera, an input section 70 for allowing a user to perform operation input, a lens driving control section 80 for controlling driving of the lens within the camera block 15.

The camera block 15 has a configuration in which an optical system including the zoom lens 1 (or 2, 3) and an image pickup device 16 including, for example, CCD (Charge Coupled Device) sensors, CMOS (Complementary Metal Oxide Semiconductor) sensors, or the like are combined.

The camera signal processing section 20 is configured to perform signal processing such as processing for converting the signal output from the image pickup device 16 into a digital signal, processing for removing noise, processing for correcting image quality, and processing for converting into luminance and color difference signals.

The image processing section 30 is configured to perform processing for compressing/encoding and decompressing/decoding an image signal based on a predetermined image data format, processing for converting data specification such as resolution, and the like.

The memory card 51 includes a semiconductor memory which is freely removable. The reader writer 50 is configured to write the image data encoded by the image processing section 30 into the memory card 51, and read out the image data recorded in the memory card 51.

The CPU 60 is configured to control overall circuit blocks within the digital camera 100, and to control the respective circuit blocks on the basis of the instruction input signal from the input section 70.

The input section 70 includes a shutter release button for performing a shutter operation, a selection switch for selecting an operation mode, and the like, and is configured to output the instruction input signal based on user's operation to the CPU 60.

The lens driving control section 80 is configured to control a motor, which is not shown, for driving the lenses in the zoom lens 1 (or 2, 3) and the like on the basis of the control signal from the CPU 60.

Next, the operation of the digital camera 100 will be briefly described. In the digital still camera 100, when the photographing is standby, an image signal captured by the camera block 15 under the control of the CPU 60 is output to the LCD 40 through the camera signal processing section 20 so as to be displayed as a camera-through-image.

Further, in the digital camera 100, when the instruction input signal for zoom in is input from the input section 70, the CPU 60 outputs the control signal to the lens driving control section 80, thereby moving the predetermined lenses in the zoom lens 1 (or 2, 3) on the basis of the control of the lens driving control section 80.

Then, in the digital camera 100, when the shutter, which is not shown, of the camera block 15 is pressed by the instruction input signal from the input section 70, the captured image signal is output from the camera signal processing section 20 to the image processing section 30.

In the image processing section 30, the image signal supplied from the camera signal processing section 20 is compressed/encoded, and subsequently is converted into digital data of the predetermined data format, and the converted data is written in the memory card 51 through the reader writer 50.

Furthermore, focusing is performed by allowing the lens driving control section 80 to drive and control the zoom lens 1 (or 2, 3) on the basis of the control signal received from the CPU 60, for example, when the shutter release button is pressed halfway or pressed fully for recording.

For reproduction of image data recorded in the memory card 51, the CPU 60 allows the reader writer 50 to read out the image data from the memory card 51 in response to the operation performed on the input section 70. The readout image data is decompressed/decoded in the image processing section 30 and then is outputted to the LCD 40.

The LCD 40 is configured to display a reproduced image on the basis of the decompressed/decoded image data by the image processing section 30.

In addition, in the embodiment, the case where the image capture apparatus according to the embodiment of the invention is applied to a digital camera was described. However, it may also be applied to a different image capture apparatus, for example, a digital video camera.

4. Other Embodiments

Specific shapes and structure of components and numerical values described or shown in the above-mentioned embodiments and the first to third numerical examples are only illustrative examples of the embodiments for carrying out the invention, and they should not be interpreted as limiting the technical scope of the invention.

Furthermore, the above-mentioned embodiment described the case where specific numerical values in Tables 5, 10, and 15 are represented on the basis of the first to third numerical examples was described. However, the invention is not limited to this, and otherwise various specific shapes, structures, numerical values may be used if only Conditional Expressions (1) to (5) are satisfied.

Further, the above-mentioned first to third numerical examples described the case where the zoom lenses 1 to 3 are configured to include the first lens group G1 to the third lens group G3 was described. However, the invention is not limited to this, and the zoom lenses 1 to 3 may be configured to include a plurality of lens groups, for example, four groups or five groups.

Furthermore, the above-mentioned first to third numerical examples described the case where the second lens group G2, which is an anti-vibration lens group, is used as the vertically movable lens group which is movable in the direction substantially perpendicular to the optical direction. However, the invention is not limited to this, and by using, instead of the second lens group G2, the first lens group G1 or the third lens group G3 as the vertically movable lens group, the light amount balance may be adjusted.

Furthermore, in the above-mentioned embodiment, the case where the image capture apparatus is mounted on, for example, the digital camera 100 was exemplified. However, the subject on which the image capture apparatus can be mounted is not limited to this, and may be broadly applicable to various other electronics such as a digital video camera, a mobile phone, a personal computer equipped with a camera, and a PDA provided with a camera.

The present application contains subject matter related to that disclosed in Japanese Priority Patent Application JP 2009-086541 filed in the Japan Patent Office on Mar. 31, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   at least one or more vertically movable lens groups among at least three or more lens groups, which constitute a zoom lens, movable in an optical axis direction, the vertically movable lens group being movable in a direction substantially perpendicular to the optical axis;
   a zoom lens group among the three or more lens groups, the zoom lens group being movable in the optical axis direction; and
   a correction mechanism that corrects a position of the optical axis based on the three or more lens groups by moving the vertically movable lens group in a wide-angle end state to a predetermined position in the substantially perpendicular direction,
   wherein
   when the vertically movable lens group is moved for the purpose of anti-vibration at each zoom position in the substantially perpendicular direction,
   the following Conditional Expression (1) is satisfied;

$$0.7 < (Lw+Bw)/Bt < 1.3, \tag{1}$$

where
Lw is an amount of shift for correcting the position of the optical axis,
Bw is an amount of shift for anti-vibration in the wide-angle end state, and
Bt is an amount of shift for anti-vibration in a telephoto end state.

2. The image capturing apparatus according to claim 1, wherein the following Conditional Expressions (2) and (3) are satisfied;

$$0.2 < ((1-\beta iw) \times \beta rw)/((1-\beta it) \times \beta rt) < 0.7, \text{ and} \tag{2}$$

$$((1-\beta iw) \times \beta rw) > fw \times \tan 0.5, \tag{3}$$

where
$\beta iw$ is a paraxial lateral magnification of the vertically movable lens group at the wide-angle end state,
$\beta rw$ is a paraxial lateral magnification of a lens group disposed closer to the image pickup surface side than the vertically movable lens group in the wide-angle end state,
$\beta it$ is a paraxial lateral magnification of the vertically movable lens group in the telephoto end state,
$\beta rt$ is a paraxial lateral magnification of a lens group disposed closer to the image pickup surface side than the vertically movable lens group in the telephoto end state, and
fw is a focal length in the wide-angle end state.

3. The image capturing apparatus according to claim 1 or 2, wherein the following Conditional Expression (4) is satisfied;

$$((1-\beta it) \times \beta rt)/((1-\beta iw) \times \beta rw) < 1.1 \times (Bt/Bw) \tag{4}.$$

4. The image capturing apparatus according to claim 1, wherein the following Conditional Expression (5) is satisfied;

$$\alpha \times ((1-\beta iw) \times \beta rw)/((1-\beta it) \times \beta rt) > 1.33 \tag{5}$$

where
$\alpha$ is a zoom ratio of the zoom lens group.

5. An optical adjustment method for an image capturing apparatus including at least one or more vertically movable lens groups among at least three or more lens groups, which constitute a zoom lens, movable in an optical axis direction, the vertically movable lens group being movable in a direction substantially perpendicular to the optical axis, a zoom lens group among the three or more lens groups, the zoom lens group being movable in the optical axis direction, and a correction mechanism that corrects a position of the optical axis based on the three or more lens groups by moving the vertically movable lens group in a wide-angle end state to a predetermined position in the substantially perpendicular direction, the optical adjustment method comprising the step of:
   moving the vertically movable lens group for the purpose of anti-vibration at each zoom position in the substantially perpendicular direction,
   wherein the following Conditional Expression (1) is satisfied;

$$0.7 < (Lw+Bw)/Bt < 1.3 \tag{1}$$

where
Lw is an amount of shift for correcting the position of the optical axis,
Bw is an amount of shift for anti-vibration in the wide-angle end state, and
Bt is an amount of shift for anti-vibration in a telephoto end state.

6. The image capturing apparatus according to claim 1, wherein the following Conditional Expression (5) is satisfied;

$$\alpha \times ((1-\beta iw) \times \beta rw)/((1-\beta it) \times \beta rt) > 1.33 \quad (5)$$

where $\alpha$ is a zoom ratio of the zoom lens group.

7. The image capturing apparatus according to claim 2, wherein the following Conditional Expression (5) is satisfied;

$$\alpha \times ((1-\beta iw) \times \beta rw)/((1-\beta it) \times \beta rt) > 1.33 \quad (5)$$

where $\alpha$ is a zoom ratio of the zoom lens group.

8. The image capturing apparatus according to claim 3, wherein the following Conditional Expression (5) is satisfied.

$$\alpha \times ((1-\beta iw) \times \beta rw)/((1-\beta it) \times \beta rt) > 1.33 \quad (5)$$

where $\alpha$ is a zoom ratio of the zoom lens group.

* * * * *